(12) United States Patent  
Funkhouser et al.

(10) Patent No.: US 7,463,238 B2  
(45) Date of Patent: Dec. 9, 2008

(54) RETRACTABLE FLEXIBLE DIGITAL DISPLAY APPARATUS

(75) Inventors: Phillip Funkhouser, Dunwoody, GA (US); Bill Moultrie, Marietta, GA (US); Wayne Utz, Alpharetta, GA (US)

(73) Assignee: VirtualBlue, LLC, Atlanta, GA (US)

( * ) Notice: Subject to any disclaimer, the term of this patent is extended or adjusted under 35 U.S.C. 154(b) by 557 days.

(21) Appl. No.: 10/916,212

(22) Filed: Aug. 11, 2004

(65) Prior Publication Data

US 2005/0040962 A1 Feb. 24, 2005

Related U.S. Application Data

(60) Provisional application No. 60/573,534, filed on May 21, 2004, provisional application No. 60/513,854, filed on Oct. 23, 2003, provisional application No. 60/504,133, filed on Sep. 19, 2003, provisional application No. 60/501,483, filed on Sep. 9, 2003, provisional application No. 60/494,237, filed on Aug. 11, 2003.

(51) Int. Cl.  
*G09G 3/34* (2006.01)

(52) U.S. Cl. .................................. 345/107; 345/905

(58) Field of Classification Search ............... 345/30, 345/55, 905, 901, 107; 361/681; 242/67.3, 242/67.4, 188  
See application file for complete search history.

(56) References Cited

U.S. PATENT DOCUMENTS

| | | | | |
|---|---|---|---|---|
| 3,780,458 | A * | 12/1973 | Jacoby et al. | 40/471 |
| 5,790,371 | A * | 8/1998 | Latocha et al. | 361/681 |
| 6,498,597 | B1 * | 12/2002 | Sawano | 345/905 |
| 6,665,173 | B2 * | 12/2003 | Brandenberg et al. | 345/905 |
| 6,680,724 | B2 | 1/2004 | Lichtfuss | |
| 6,734,842 | B2 * | 5/2004 | Woodmansee et al. | 345/905 |
| 6,771,232 | B2 * | 8/2004 | Fujieda et al. | 345/30 |
| 6,992,693 | B2 * | 1/2006 | Tajika et al. | 345/905 |
| 2002/0090980 | A1 | 7/2002 | Wilcox et al. | |
| 2003/0071800 | A1 | 4/2003 | Vincent et al. | |

* cited by examiner

*Primary Examiner*—Kevin M Nguyen  
(74) *Attorney, Agent, or Firm*—Morris Manning & Martin, LLP

(57) ABSTRACT

The present invention provides a flexible digital display retractable into a portable housing. Electronic components are contained within the housing to provide for portable storage, viewing and markup of digital documents, such as full-size architectural drawings, on the digital display device.

28 Claims, 36 Drawing Sheets

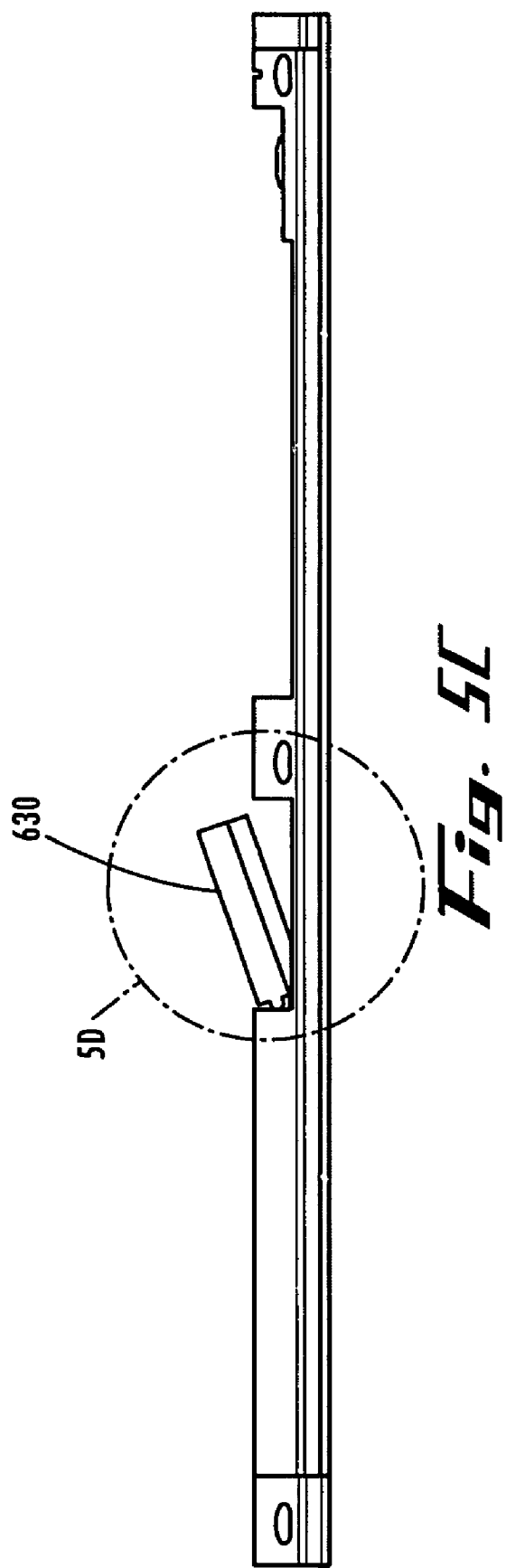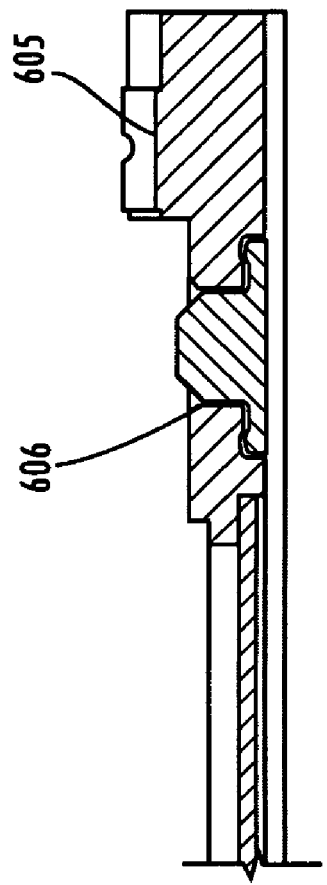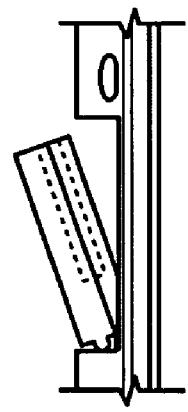

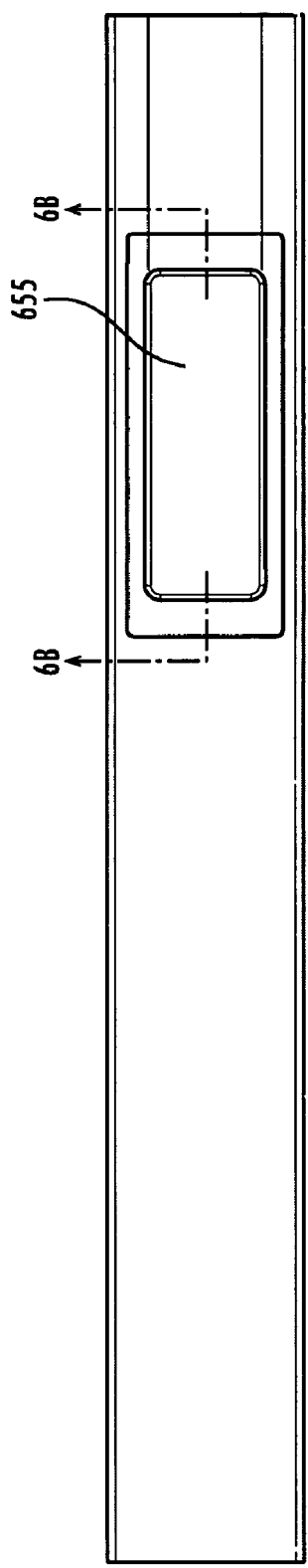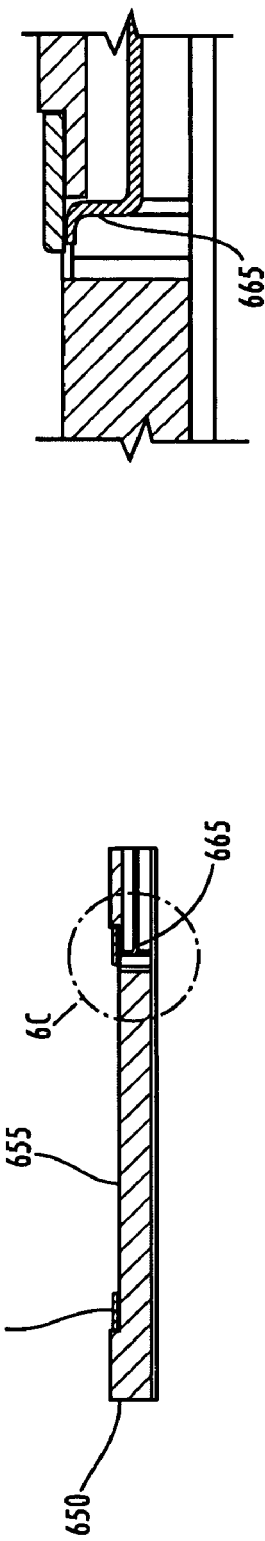

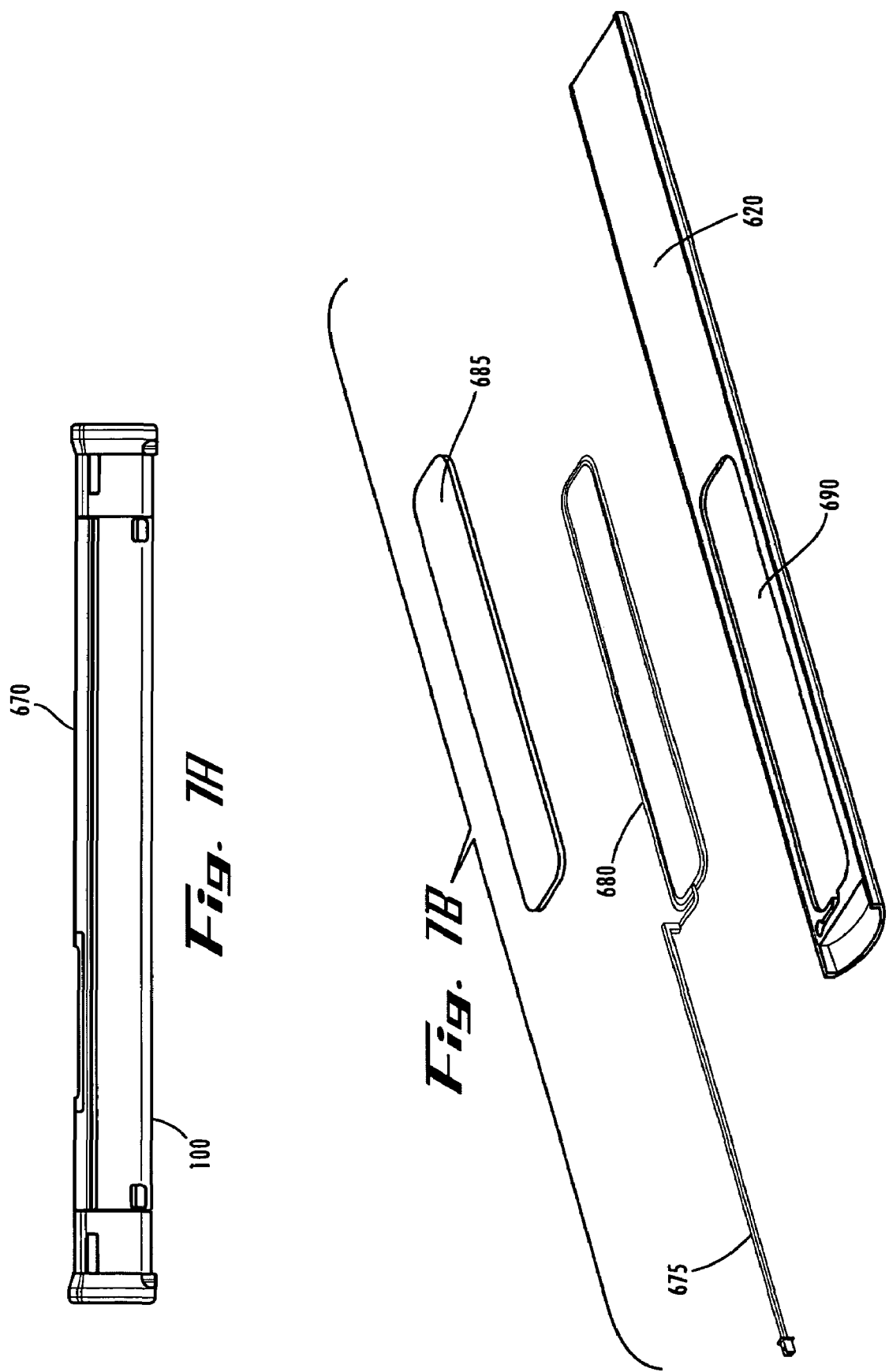

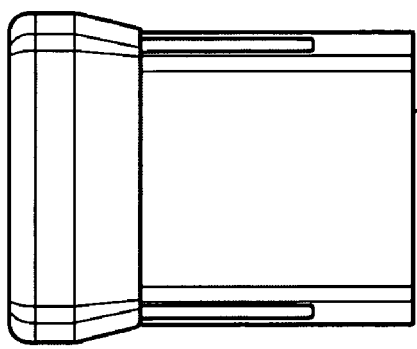
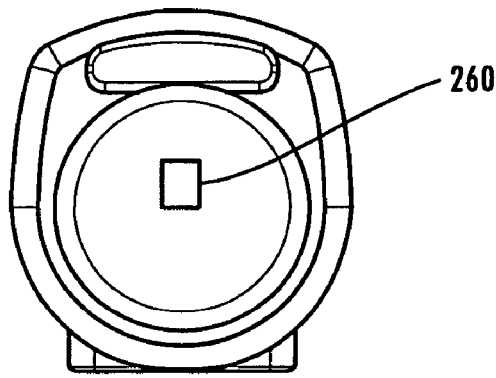
Fig. 10A  Fig. 10B
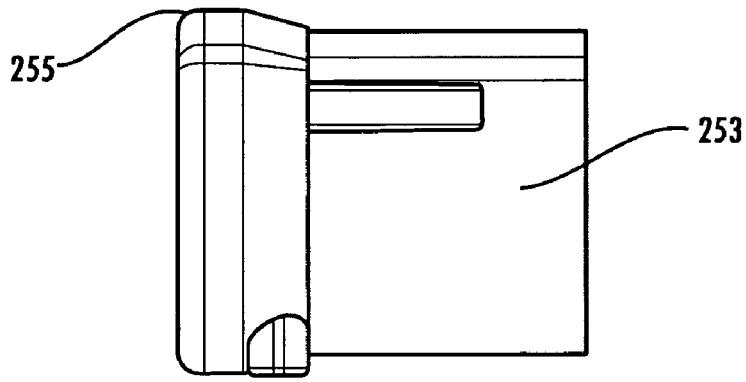
Fig. 10C
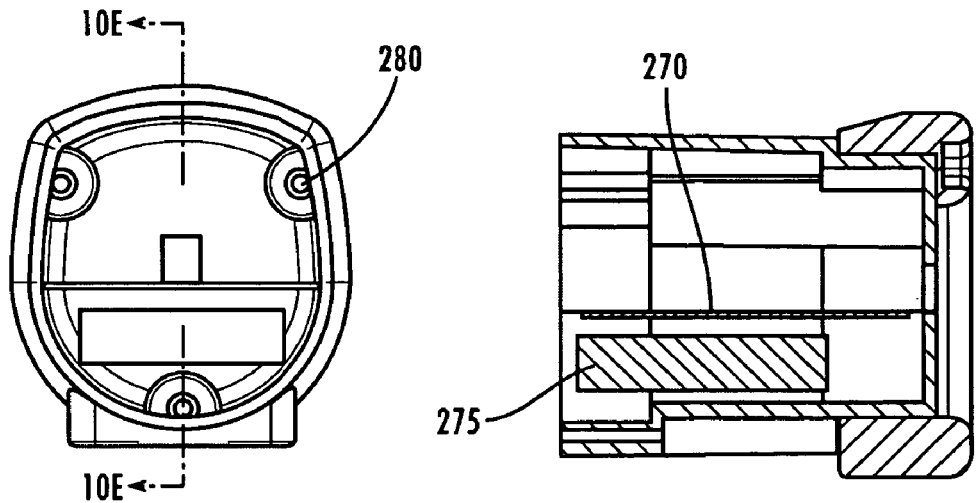
Fig. 10D  Fig. 10E

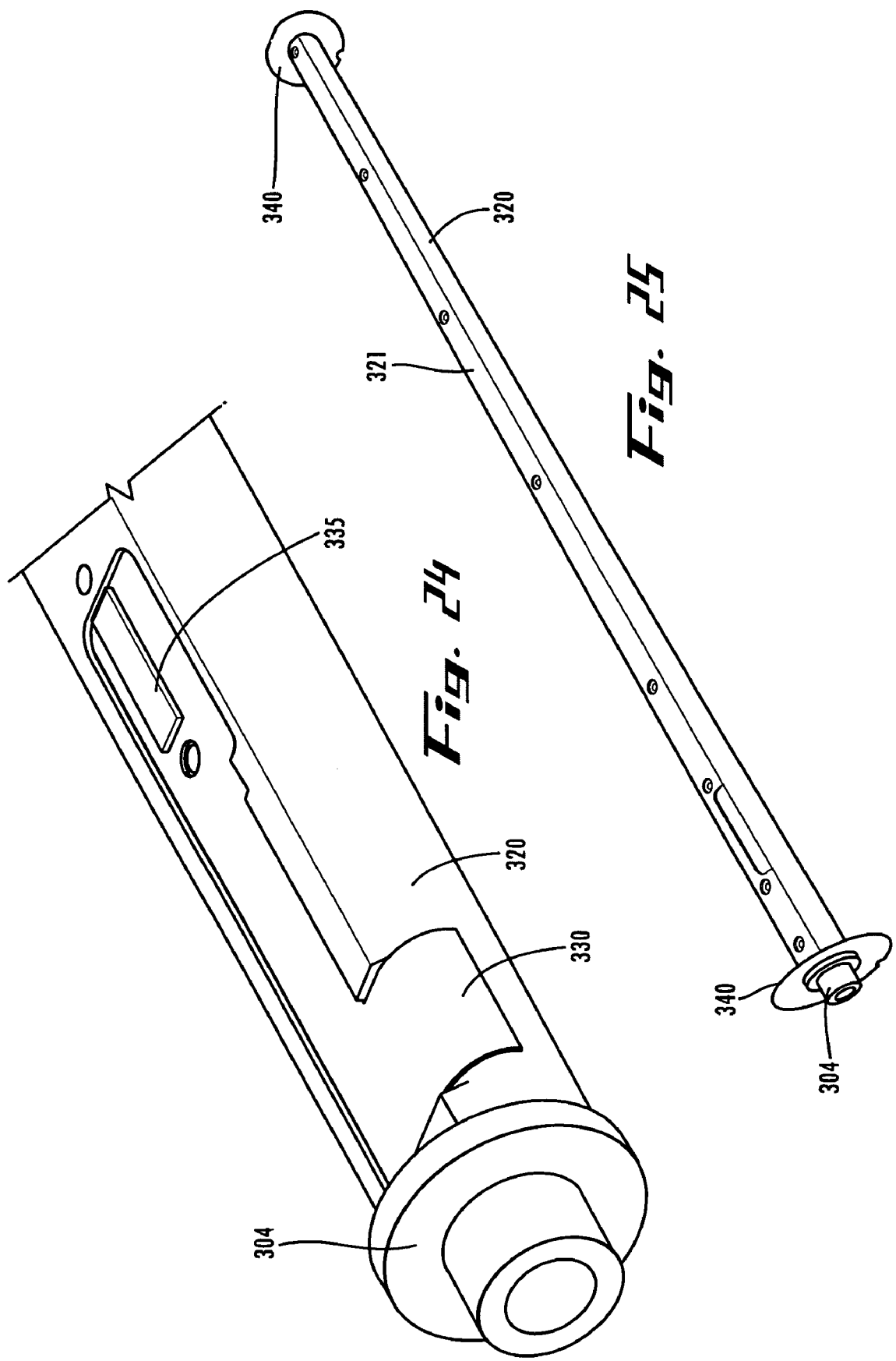

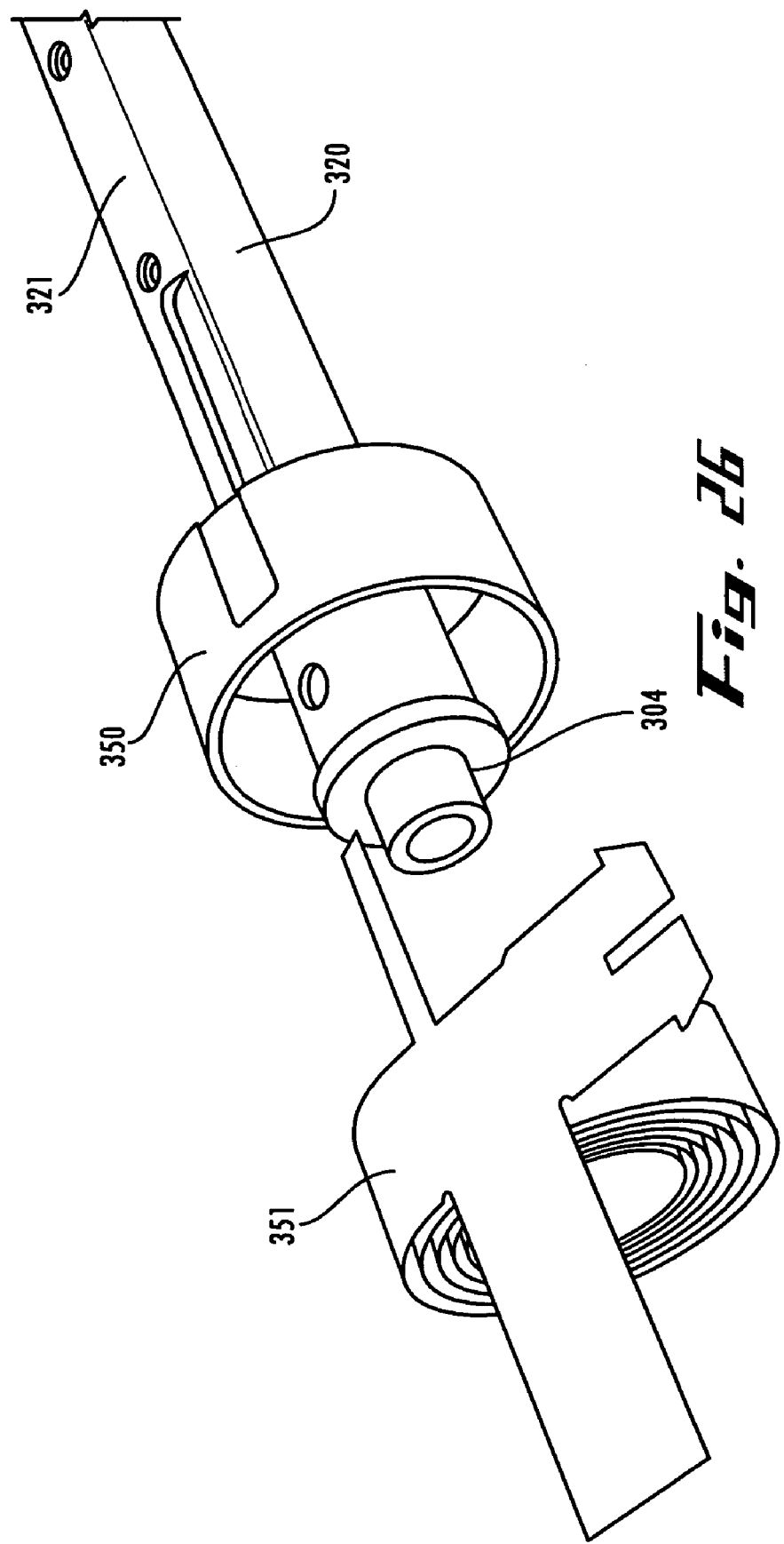

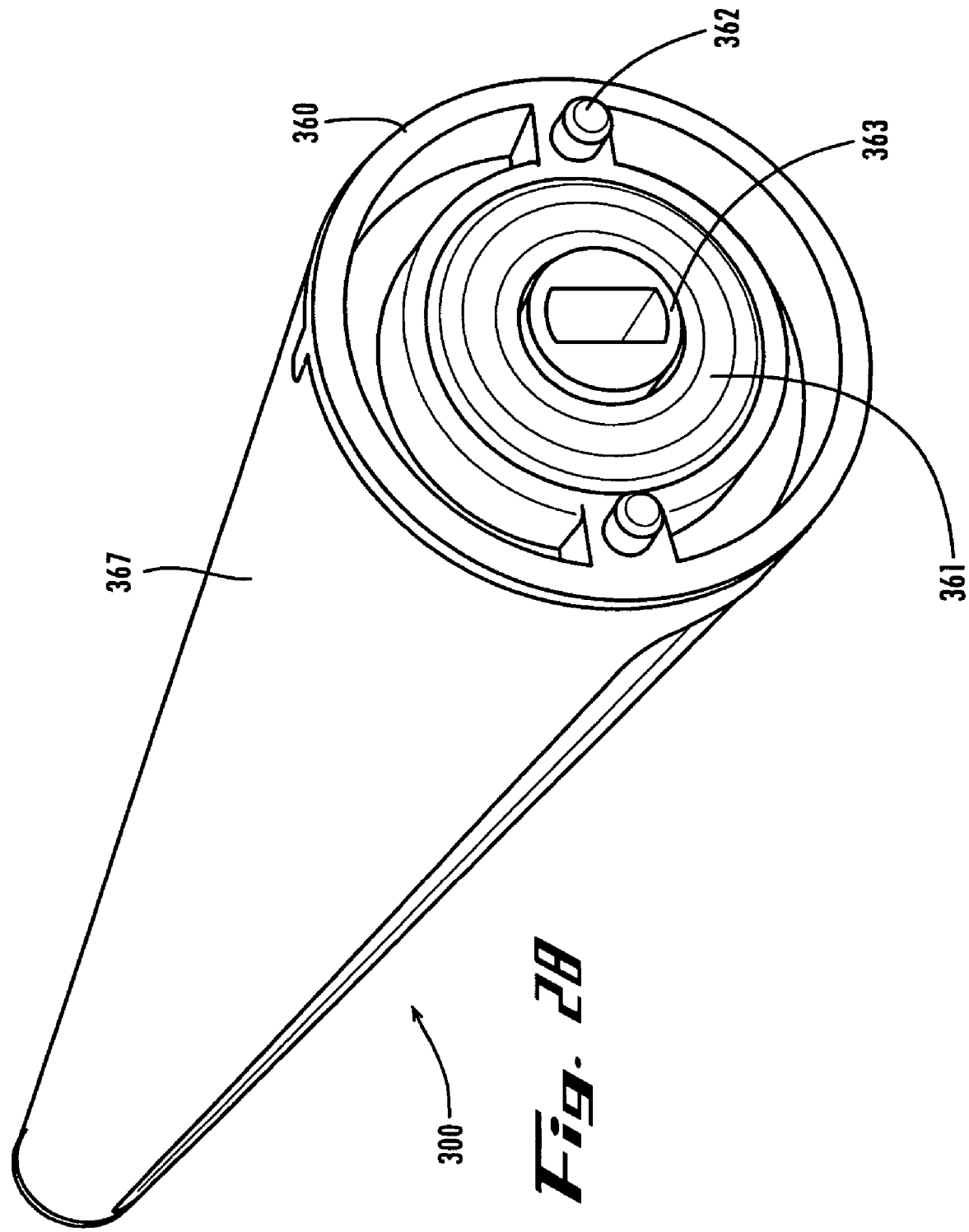

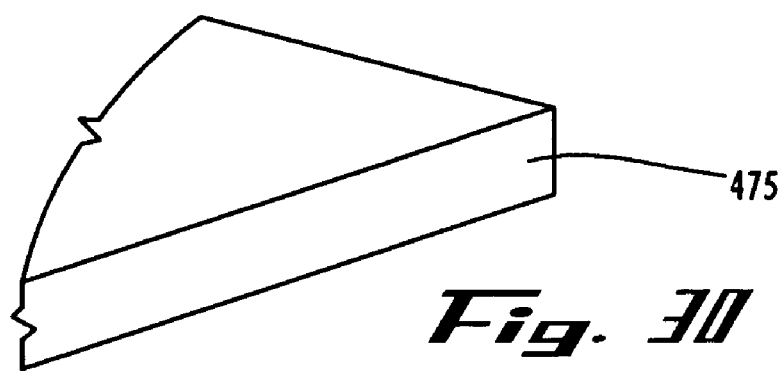
Fig. 30
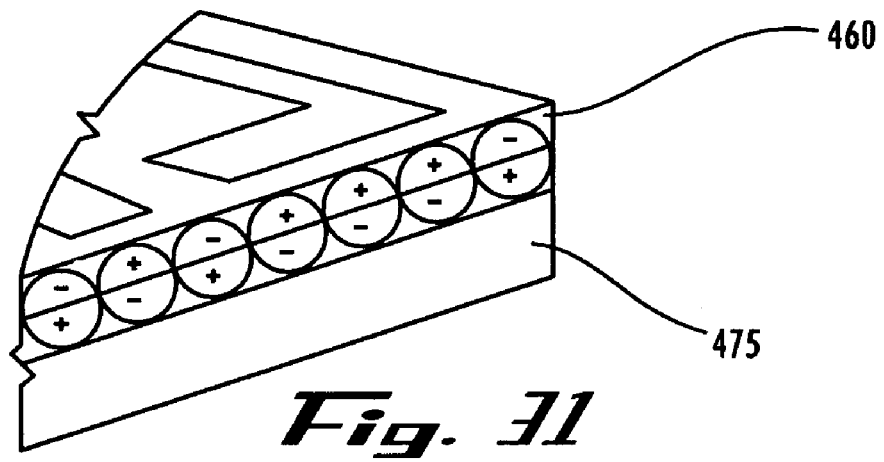
Fig. 31
| 185 | 190 | |
|---|---|---|
| 175 | | |
| 165 | | |
| 150 | | |
| 170 | | |
Fig. 32

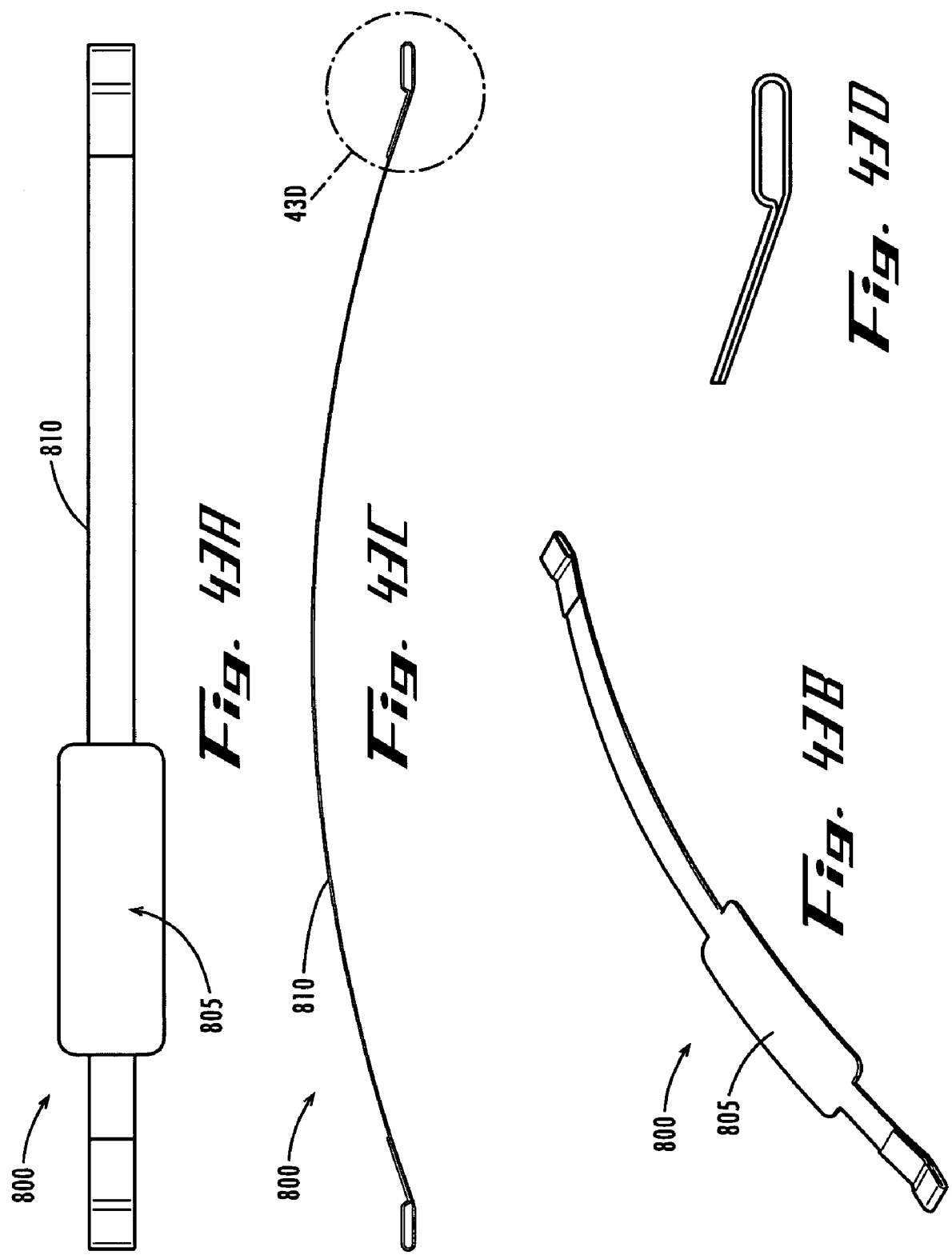

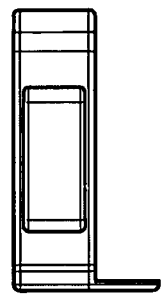
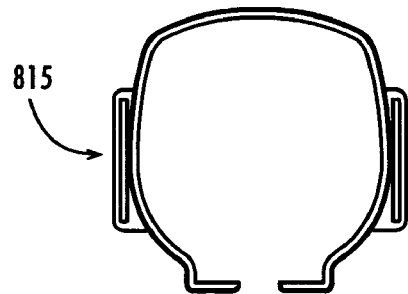
Fig. 44A  Fig. 44B
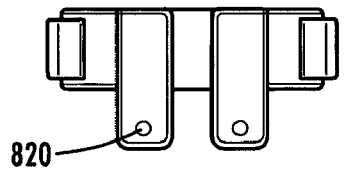
Fig. 44C
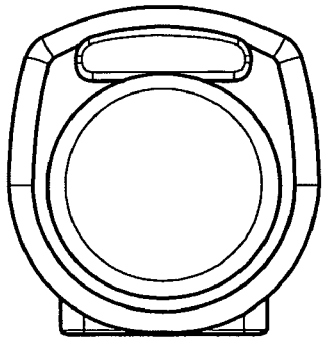 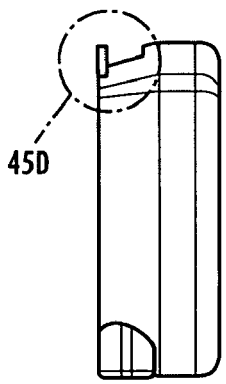 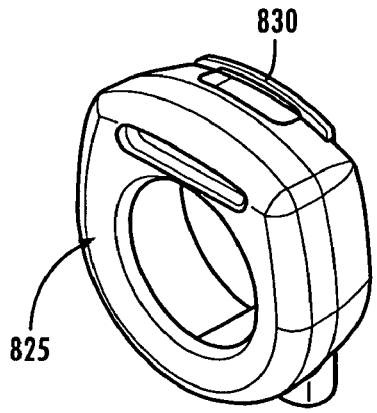
Fig. 45A  Fig. 45B  Fig. 45C
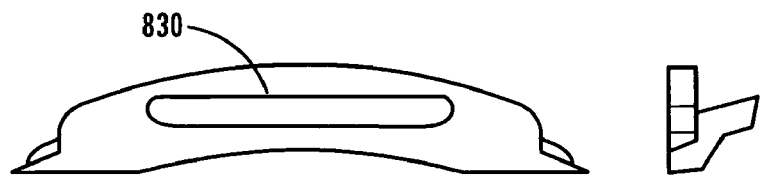
Fig. 45D

RETRACTABLE FLEXIBLE DIGITAL DISPLAY APPARATUS

CROSS-REFERENCE TO RELATED APPLICATIONS

This application claims the benefit of priority of Provisional U.S. Pat. Application Nos. 60/494,237 filed Aug. 11, 2003, 60/501,483 filed Sep. 9, 2003, 60/504,133 filed Sep. 19, 2003, 60/513,854 filed Oct. 23, 2003 and 60/573,534 filed May 21, 2004, all of which are herein incorporated by reference.

TECHNICAL FIELD OF THE INVENTION

The present invention relates to viewing devices and, more particularly, to a flexible digital display retractable into a portable weatherproof and shock-resistant housing for transport.

BACKGROUND OF THE INVENTION

Architectural, engineering and/or construction (AEC) firms currently use paper as a primary method for displaying job site data that is used in the design, engineering and construction of a structure or location. These drawings and specifications are produced and manipulated in a digital format during architectural design and mechanical engineering. However, these same drawings are subsequently printed onto paper for bidding, permitting and job site use. Printed reproductions of original drawings and documents are also required by all original and ongoing parties involved in a project. When changes are made to a drawing for a given job, the printed changes must be reproduced and sent to all original and ongoing parties involved with the project.

Accordingly, today's AEC print documents are inefficient, present transport problems, are subject to wear, require vast storage space and produce significant waste. In addition, replication of engineering and architectural drawings requires highly specialized and costly printing equipment.

Under the present invention, printed drawings and documents substantially remain in the digital format using a portable retractable digital display throughout the job cycle. Maintaining the drawings and documents in a digital format reduces the costs and wastes associated with the printed documents. A digital format also allows the user instant access to any drawing or document for any job that the user is responsible for. Portable digital format drawings and documents also allows for updates to any job to be received electronically through any number of available industry standard network (both wired and wireless) technologies or more simply by shipping additional lightweight memory modules.

Digital drawings and documents displayed by the viewing device of the invention also allows the expiration of an drawing or document within a timeframe specified by the firm responsible for creation of said intellectual property. For example, in a bidding process of a job with multiple vendors but only limited awards, drawings and documents are seldom returned to the intellectual property owner. Under the present invention, drawings and documents can expire at the end of a bid process.

The digital format of the drawings and documents displayed by the viewing device also allows for a lowered weight factor in the device. The digital format of the drawings and documents further allows for an increase in storage, handling, processing and displaying of many more drawings.

U.S. Pat. No. 6,680,724, incorporated herein by reference, suggests the use of thin, flexible screen technologies in conjunction with electronic image viewing; however such a device is bulky and non-retractable. The portability and storage of such device is highly restrictive and not easily used at multiple locations and busy environments, such as on-site and off-site use and transfer in connection with a construction project.

Accordingly, the present invention answers specific needs associated with drawings in the construction and architectural fields, but also provides advantageous portability options to thin-screen viewing devices in all markets.

SUMMARY OF THE INVENTION

The invention provides a portable, retractable viewing device. In embodiments of the invention the viewing device is connected to a network.

In one embodiment of the invention, the device is comprised of a flexible display which is retracted into a protective housing during transport and for storage. In embodiments of the invention, the electronics responsible for processing drawings and documents for display on the flexible display are held within the protective housing. The housing also contains a retractable reel for retracting the flexible display. In an embodiment, the flexible display comprises a weather resistant cover surface and a backing surface oppositely disposed relative to the first surface and the flexible display located between the first and second surface. The protective housing also contains, in various embodiments, electronics such as a processing unit, memory units, network connectivity components, external power supply and internal battery unit.

Although one embodiment of the present invention is described relating to the architectural, engineering and construction fields, the present invention may be utilized in Field Force Automation, surveying (PLATS), air and sea charting and navigation, maps, GPS-based mapping, project planning (including where a large screen enables several viewers and displays simultaneously), military applications, personal computing, visual entertainment, including viewing of video and graphical files, electronic publication of books, magazines and the like, electronic video games, electronic sports playbooks, and like display uses. It will be appreciated that these examples are merely by illustration and the present invention may be implemented in connection with virtually any other application or need for which two and three dimensional text, multimedia objects, graphics and images, especially large images, are advantageously viewed portably.

BRIEF DESCRIPTION OF THE DRAWINGS

FIG. 5C is a side view showing the user interface bezel assembly with the flash-card accessory module in an embodiment of the invention.

FIG. 5D is a side detail view along B of FIG. 5C showing the user interface bezel assembly with the flash-card accessory module in an embodiment of the invention.

FIG. 5E is a side detail view along F of FIG. 5B showing the user interface bezel assembly with the flash-card accessory module in an embodiment of the invention.

FIG. 6A is a top view showing the main extrusion molded fascia panel assembly with the integrated solar power bezel assembly in an embodiment of the invention.

FIG. 6B is a sectional view along line A-A showing the main extrusion molded fascia panel assembly with the integrated solar power bezel assembly in an embodiment of the invention.

FIG. 6C is a detail view along C of FIG. 6B showing the main extrusion molded fascia panel assembly with the integrated solar power bezel assembly in an embodiment of the invention.

FIG. 6D is a side view showing the main extrusion molded fascia panel assembly with the integrated solar power bezel assembly in an embodiment of the invention.

FIG. 7A is a right side view of a portable retractable flexible display device in an embodiment of the invention.

FIG. 7B is an exploded view showing the main extrusion molded fascia panel assembly with the integrated wireless antenna assembly in an embodiment of the invention.

FIG. 10A is a side view showing the lower casing assembly in an embodiment of the invention.

FIG. 10B is a cross-sectional front view showing the lower casing assembly with an input/output port connector panel in an embodiment of the invention.

FIG. 10C is a cross-sectional side view showing the lower casing assembly with a molded elastomeric bumper in an embodiment of the invention.

FIG. 10D is a cross-sectional view showing the lower casing assembly in an embodiment of the invention.

FIG. 10E is sectional view along line A-A showing the lower casing assembly in an embodiment of the invention.

FIG. 24 is a perspective view of the display reel and flex circuit jumper with the flexible display elastomeric connector in an embodiment of the invention.

FIG. 25 is a perspective view of flexible display centering devices attached to both ends of the display reel mechanism assembly in an embodiment of the invention.

FIG. 26 is a perspective view showing flex-coil connector jumper and cartridge attached to the display reel mechanism assembly in an embodiment of the invention.

FIG. 28 is a perspective view showing the drive end view of the display cartridge assembly which attaches to the drive casing assembly in an embodiment the invention.

FIG. 30 is a side cross-sectional perspective view of an active matrix flexible display driver layer showing the intersecting addressable points of the active matrix flexible display driver layer in an embodiment of the invention.

FIG. 31 is a side perspective view of an active matrix flexible display driver layer and the display layer showing how the addressable points of the active matrix flexible display driver layer have rotated the particles within the display layer by changing the electrical polarity of those points either positively or negatively which rotate the display layer particles in an embodiment of the invention.

FIG. 32 is a cross-sectional circuit block diagram of the flexible active matrix driver layer showing the layers of the circuit as they are applied to a flexible substrate in an embodiment of the invention.

FIG. 43A is top plan view of a shoulder strap assembly in an embodiment of the invention.

FIG. 43B is top perspective view of a shoulder strap assembly in an embodiment of the invention.

FIG. 43C is side view of a shoulder strap assembly in an embodiment of the invention.

FIG. 43D is detail view along A of FIG. 43C of a shoulder strap assembly in an embodiment of the invention.

FIG. 44A is a side view of a removable strap mount in embodiment of the invention.

FIG. 44B is a front view of a removable strap mount in embodiment of the invention.

FIG. 44C is a bottom view of a removable strap mount in embodiment of the invention.

FIG. 45A is a front view of a strap mount bumper assembly in an embodiment of the invention.

FIG. 45B is a side view of a strap mount bumper assembly in an embodiment of the invention.

FIG. 45C is a front perspective view (from above) of a strap mount bumper assembly in an embodiment of the invention.

FIG. 45D is a detail view along A of FIG. 45B of a strap mount bumper assembly in an embodiment of the invention.

DETAILED DESCRIPTION OF THE INVENTION

Figure 1:
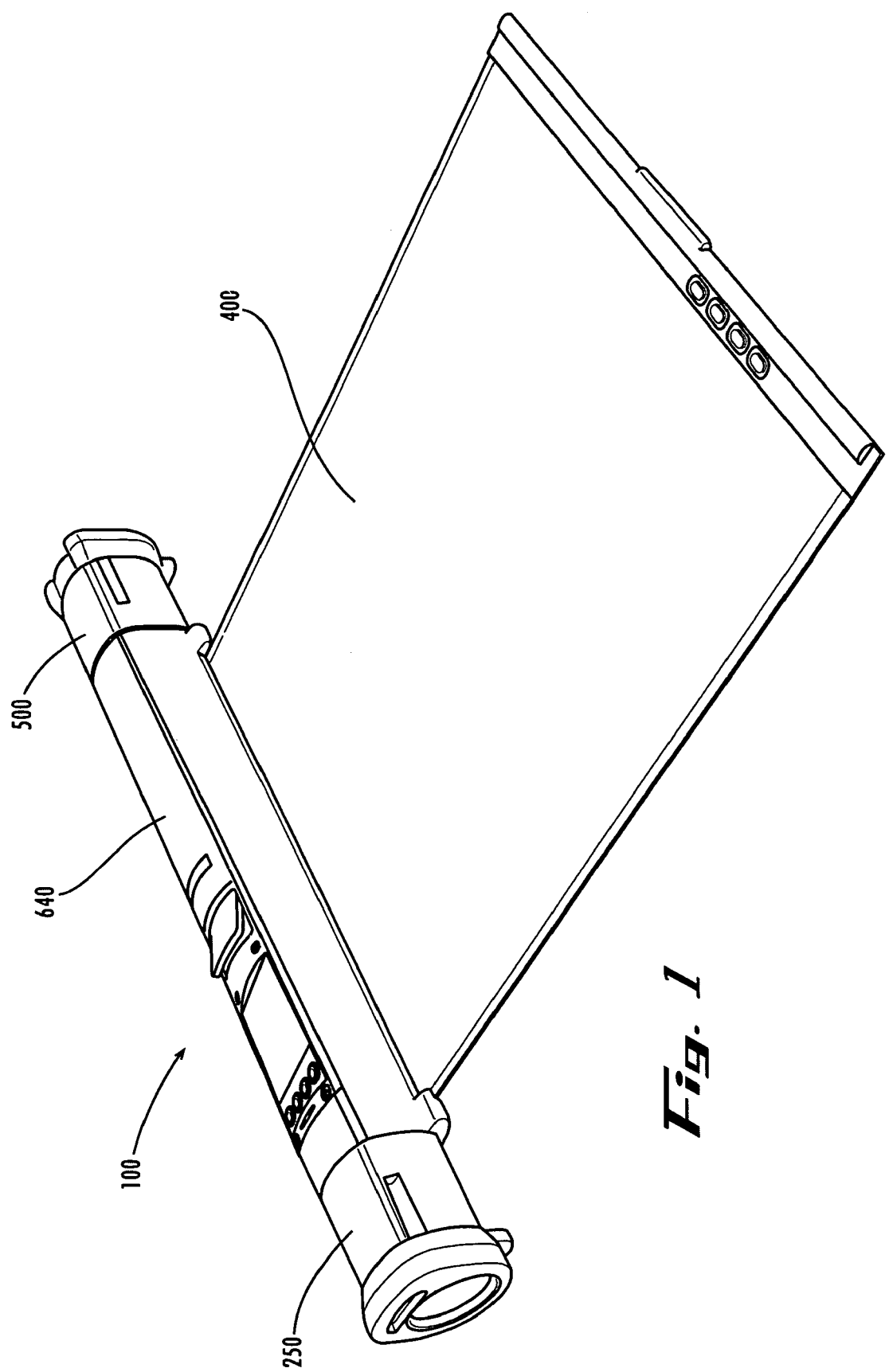
FIG. 1 is a perspective view from above of a portable retractable flexible digital display device in an embodiment of the invention.

For purposes of this description, the following table cross-references numbered elements of the invention with figures including the respective elements. It will be appreciated that a particular element may be included in various figures, as the drawings provide a variety of views of the invention. Accordingly, where reference is made to one or more drawings in the subsequent description, it will be appreciated that such reference is merely illustrative, as the drawings and description should be taken in their entirety to fully appreciate the described aspects of the invention. Further, it will be appreciated that elements may appear in one or more drawings without a reference numeral.

TABLE

Cross-Reference of Elements to Drawings

| Description | Element Number | Figure(s) |
|---|---|---|
| Portable Viewing Device | 100 | 1, 7A, 32 |
| Power Wiring Harness | 150 | 32 |
| Circuit Assembly | 155 | 33 |
| Via | 160 | 34 |
| Select Line Circuit | 165 | 32, 35 |
| Pixel Electrode | 170 | 32, 36 |
| Dielectric Layer | 175 | 32, 37 |
| Drain Line Circuit | 180 | 38 |
| Data Line Circuit | 185 | 32, 39 |
| Semiconductor | 190 | 40 |
| Display Control Section | 200 | 20, 41 |
| RAM Module | 205 | 20 |
| Programmable ROM | 210 | 20 |
| Display Memory Module | 215 | 20 |
| Display Controller | 220 | 20 |
| Communication I/O Controller Interface | 225 | 20 |
| External Interface Controller | 230 | 20 |
| Power Management Controller | 235 | 20 |
| Central Processing Unit (CPU) | 240 | 20 |

TABLE-continued

Cross-Reference of Elements to Drawings

| Description | Element Number | Figure(s) |
|---|---|---|
| Security Co-Processor | 245 | 20 |
| Lower Casing Assembly | 250 | 1, 10A, 41 |
| Lower Casing Extrusion Outer Housing | 253 | 10C, 11A |
| Lower Casing Outer Housing Bumper Assembly | 255 | 10C, 11A |
| Input/Output Panel | 260 | 10B |
| Lower Female Assembly Coupling | 265 | 11B |
| Coupling Receptacle Housing | 266 | 11C |
| Cantilever Contact Springs | 267 | 11C |
| Coupling Alignment Keyway | 268 | 11C |
| Lower Casing Support Plate | 269 | 11B |
| Main Electronics Printed Circuit (PCB) Board | 270 | 10E |
| Stepper Motor Control Board | 275 | 10E |
| Lower Assembly Mounting Screws | 280 | 10D |
| Display Cartridge Spooling Mechanism | 300 | 21, 22, 27, 28, 41 |
| Slipring Quick Connect (Male) | 301 | 22, 27 |
| Slipring Coupling | 302 | 22 |
| Cantilever Contact Pin | 303 | 22 |
| Bearing Race | 304 | 23, 24, 25, 26 |
| Slipring Mounting Plate | 305 | 22, 27 |
| Connector Foam Dust Seal | 306 | 22 |
| Slipring Quick Connect Alignment Key | 308 | 22 |
| Display Reel Shaft | 320 | 23, 24, 25, 26 |
| Display Reel Retaining Plate | 321 | 23, 25, 26, 27 |
| Display Reel Retaining Screw Mount Holes | 322 | 23 |
| Display Reel Flex Circuit Jumper | 330 | 23, 24, 27 |
| Display Reel Circuit Aperture | 331 | 27 |
| Flexible Elastomeric Connector | 335 | 24, 29F |
| Display Centering Device | 340 | 25 |
| Flex-Coil Connector Cartridge | 350 | 26 |
| Flex-Coil Circuit Jumper | 351 | 26 |
| End Bushing | 360 | 21, 22, 27 |
| Display Cartridge Roller Bearing | 361 | 21, 28 |
| Cartridge End Alignment Pins | 362 | 21, 22, 28 |
| Drive Slot | 363 | 28 |
| Display Cartridge Flex Circuit Aperture | 364 | 21 |
| Display Cartridge Aperture | 365 | 21 |
| Display Cartridge Alignment Channel | 366 | 21 |
| Display Cartridge Protective Housing | 367 | 21, 28 |
| Alignment Pin End Bushing | 368 | 22 |
| Display Assembly Mounting Screws | 369 | 22 |
| Retractable Display Assembly | 400 | 1, 18, 19, 23, 29A, 49 |
| Display Handle | 405 | 29A, 29E |
| Display Keypad | 408 | 29B |
| Flexible Display Wiring Harness | 410 | 29F |
| Upper Protective Display Layer | 415 | 18, 19 |
| Lower Protective Display Layer | 420 | 18, 19 |
| Display Size Calibration Sensor | 425 | 29A |
| Display Tray Aligning Slot | 430 | 29A |
| Display Tray Assembly Holes | 435 | 29F |
| Display Tray Locking Slot | 437 | 29G |
| Flexible Active Matrix Layer | 440 | 18, 20 |
| Flexible Microcapsule Layer | 460 | 19, 20, 31 |
| Active Matrix Driver Layer | 475 | 19, 20, 30, 31 |
| Upper Casing Assembly | 500 | 1, 17, 41 |
| Upper Casing Extrusion Outer Housing | 503 | 15A, 15B |
| Output Mount Plate Assembly | 505 | 13, 15D, 16 |
| Sealed Bearings of Output Mount Plate | 508 | 14C, 15D, 16 |
| Mechanical Roller Clutch | 510 | 14B, 14C, 16 |
| Electromagnetic Clutch Drive Shaft | 511 | 14B |
| Stepper Motor | 515 | 13, 15D, 41 |
| Upper Casing Outer Housing Bumper Assembly | 521 | 12, 15A, 15B, 17 |
| Manual Thumb Drive Wheel | 522 | 12, 17 |
| Battery | 523 | 15D |
| AC Power Receptacle | 524 | 15D |
| Output Drive Shaft | 525 | 13, 14B, 15D |
| Output Drive Shaft Gear | 526 | 13, 15D, 16 |
| Knob Drive Shaft | 527 | 14B |
| Electromagnetic Power and Control Wiring Harness | 528 | 14B |
| Drive Shaft Gear | 529 | 14B |

TABLE-continued

Cross-Reference of Elements to Drawings

| Description | Element Number | Figure(s) |
|---|---|---|
| Drive Support Plate Assembly | 530 | 14B |
| Manual Retraction Shaft | 541 | 15D |
| Drive Shaft for Stepper Motor | 544 | 13 |
| Drive Shaft Gear for Stepper Motor | 545 | 13 |
| Motor Power and Control Wiring Harness | 546 | 13 |
| AC/DC Power Inverter | 547 | 15D |
| Manual Retraction Case Access Opening | 548 | 15D |
| Upper Casing Spring | 553 | 16 |
| Drive Support Plate | 555 | 16 |
| Upper Casing Mounting Screws | 580 | 15C |
| User Interface Bezel Assembly | 605 | 2, 5E |
| User Interface Bezel Assembly Seal | 606 | 5E |
| Rubberized Buttons | 608 | 2, 5B |
| Biometric Security Interface | 610 | 3 |
| Sliding Finger Sensor | 615 | 4A, 4B |
| Sensor Aperture | 616 | 4A |
| Sensor PCB Board | 617 | 4A, 4B |
| Flex Jumper Solder Aperture | 618 | 4A |
| Sliding Finger Sensor Chip | 619 | 4A |
| Card/Media Reader Slot | 630 | 5C |
| Card Reader Panel | 631 | 8 |
| Data Media Storage | 635 | 5B |
| Center (Main) Storage Casing Outer Housing | 640 | 1, 9, 21, 41, 46, 47, 48, 49 |
| Main Extrusion Housing Mounting Screw Tap | 641 | 9 |
| Touch Screen Display | 645 | 2, 5B, 20 |
| Center Section Molded Fascia Panel | 620 | 7B |
| Solar Panel Bezel Assembly | 650 | 6B |
| Solar Panel | 655 | 6A, 6B |
| Solar Panel Bezel | 660 | 6B |
| Solar Panel Wiring Harness | 665 | 6B |
| Wireless Interface Networking Interface Assembly | 670 | 7A, 41 |
| Jumper Circuit | 675 | 7B |
| Antenna | 680 | 7B |
| Open Cell Urethane Foam Spacer | 685 | 7B |
| Wireless Antenna Recess | 690 | 7B |
| Radio Frequency (RF) Pen and Pickup Assembly | 700 | 42B, 42C |
| Sensor Assembly Housing | 710 | 42F |
| Driver PCB Assembly | 715 | 42F |
| Radio Frequency Pickup Sensor | 720 | 42F |
| Housing End Cap | 725 | 42E |
| Housing Screw Boss | 730 | 42E |
| Housing Alignment Pin | 735 | 42D |
| Wiring Hole | 740 | 42A |
| Strap Assembly | 800 | 43A |
| Shoulder Pad | 805 | 43A, 43B |
| Adjustable Shoulder Strap | 810 | 43A, 43C |
| Strap Mounts | 815 | 44B |
| Strap Mount Attachment Screws | 820 | 44C |
| Strap Mount Opening | 825 | 45C |
| Strap Plate Inserts | 830 | 45D |
| Tripod | 900 | 46 |
| Tripod Attachment Screws | 915 | 47, 48 |
| Extendable Legs | 920 | 47, 48 |
| Locking Knobs | 925 | 47 |
| Telescoping Mast for Flexible Display | 930 | 47, 48 |
| Spring-Loaded (Détented) Locking Buttons | 945 | 48 |

Referring to FIG. 1, a non-limiting embodiment of a viewing device 100 of the present invention is shown. The device 100 includes a retractable flexible digital display assembly 400 operatively, mechanically and electrically connected within center storage housing 640. The device 100 further includes a lower casing 250 and an upper casing 500 at respective ends. Lower casing 250 and upper casing 500 include electronics (CPU, Memory Modules, and similar components) a power supply, respectively, that serve to operate the retractable flexible digital display assembly 400, although it will be appreciated that other arrangements of the components and other housing designs can be provided in alternative embodiments.

Figure 18:
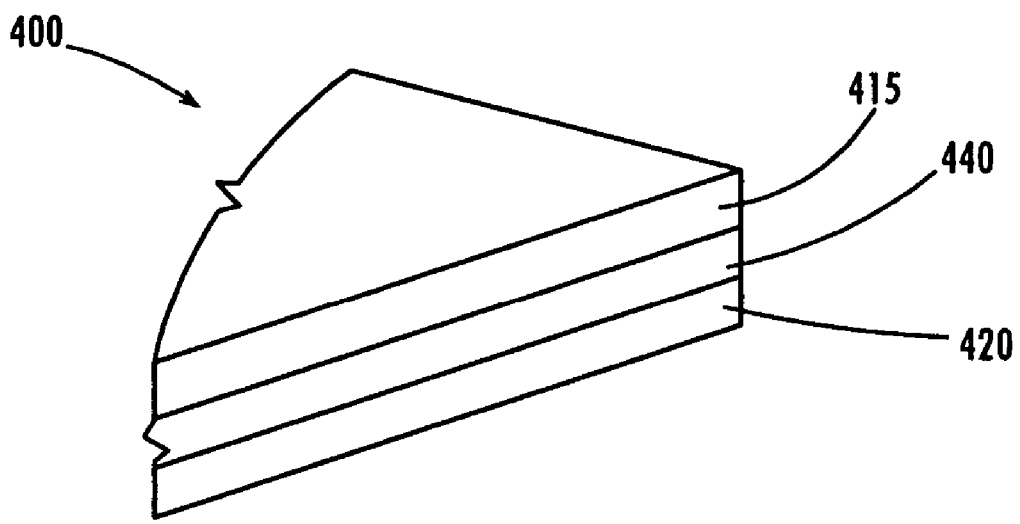
FIG. 18 is a side perspective cut away view of a portable retractable flexible active matrix (OLED) digital display having protective layers associated therewith in an embodiment of the invention.

Referring to FIG. 18, in one embodiment the retractable flexible digital display assembly 400 comprises an upper transparent weather resistant protective layer 415 and a lower protective surface 420 oppositely disposed with respect to the upper transparent weather resistant protective layer 415. As described in greater detail below, drawings, graphics, pictures, documents, text and images are displayable on the flexible active matrix (OLED) RGB color display layer 440, or, in an alternative embodiment shown in FIG. 19, on the flexible microcapsule display layer 460.

Figure 29A:
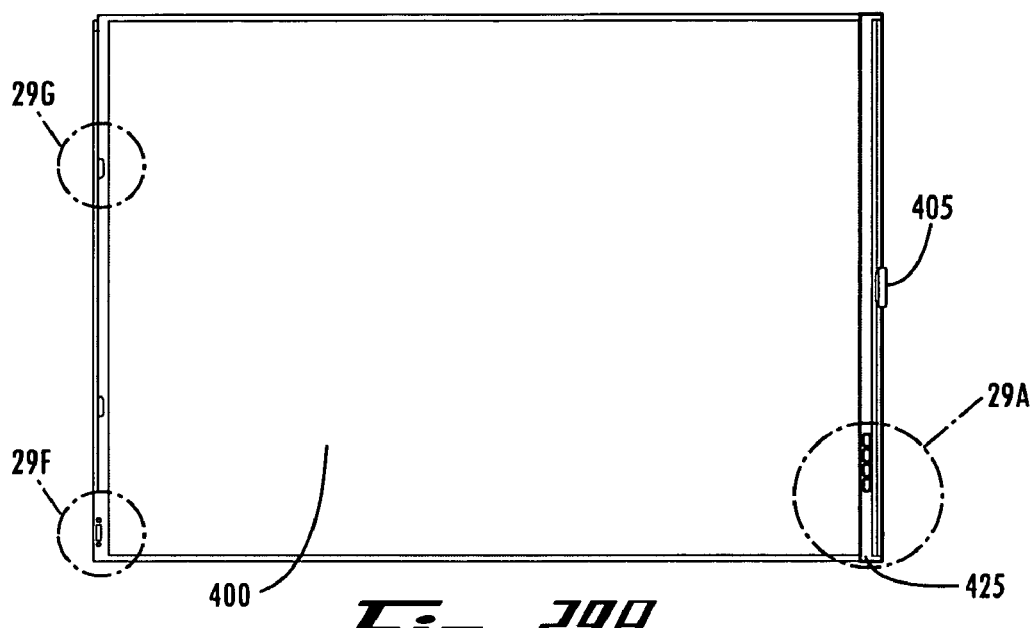
FIG. 29A is a top view a retractable flexible digital display including flexible tray in an embodiment of the invention.
Figure 29C:
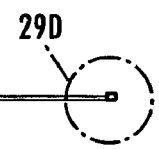
FIG. 29C is a side view a retractable flexible digital display including flexible tray in an embodiment of the invention.
Figure 29B:
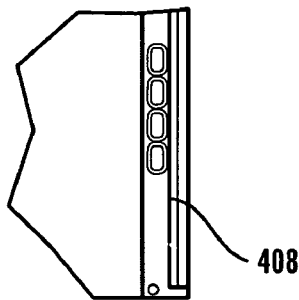
FIG. 29B is a detail view along A of FIG. 29A view of a retractable flexible digital display including flexible tray in an embodiment of the invention.
Figure 29D:
FIG. 29D is a detail view along B of a retractable flexible digital display including flexible tray in an embodiment of the invention.
Figure 29E:
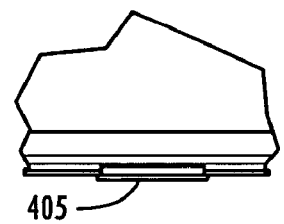
FIG. 29E is a detail view along C of FIG. 29A view of a retractable flexible digital display including flexible tray in an embodiment of the invention.
Figure 29F:
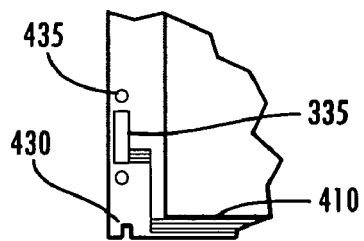
FIG. 29F is a detail view along D of FIG. 29A view of a retractable flexible digital display including flexible tray in an embodiment of the invention.
Figure 29G:
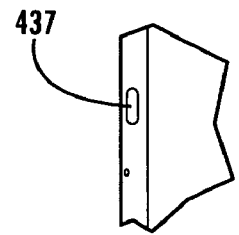
FIG. 29G is a detail view along E of FIG. 29A view of a retractable flexible digital display including flexible tray in an embodiment of the invention.
Figure 33:
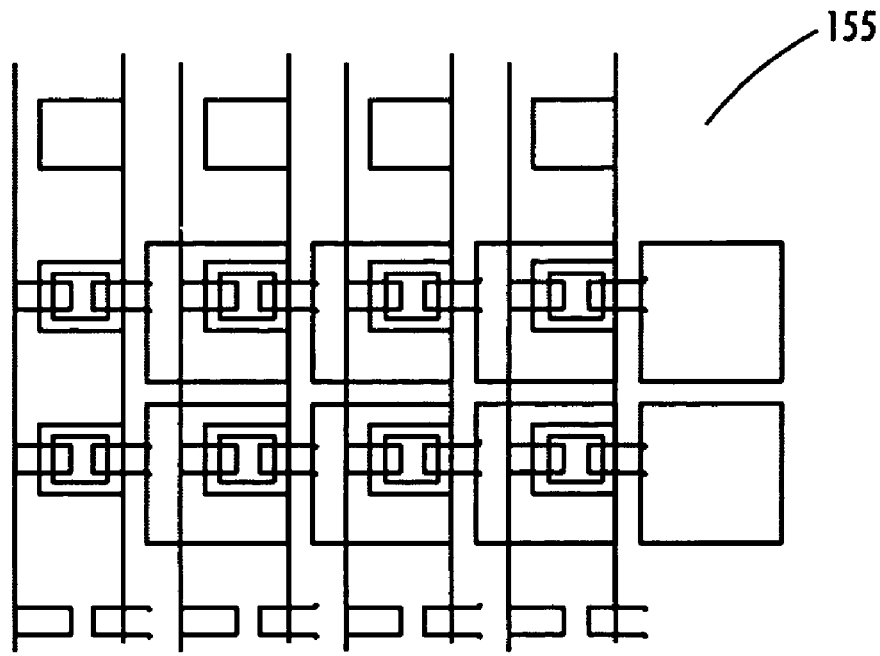
FIG. 33 is a block diagram showing the top view of the circuit design of the active matrix driver layer in an embodiment of the invention.
Figure 34:
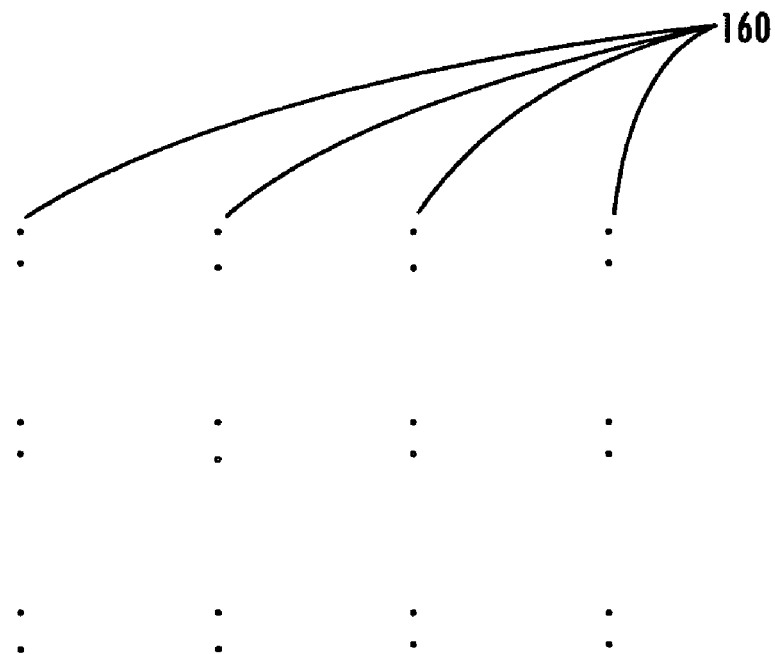
FIG. 34 is a block diagram showing the top view of the laser vias of the active matrix driver layer circuit design in an embodiment of the invention.
Figure 35:
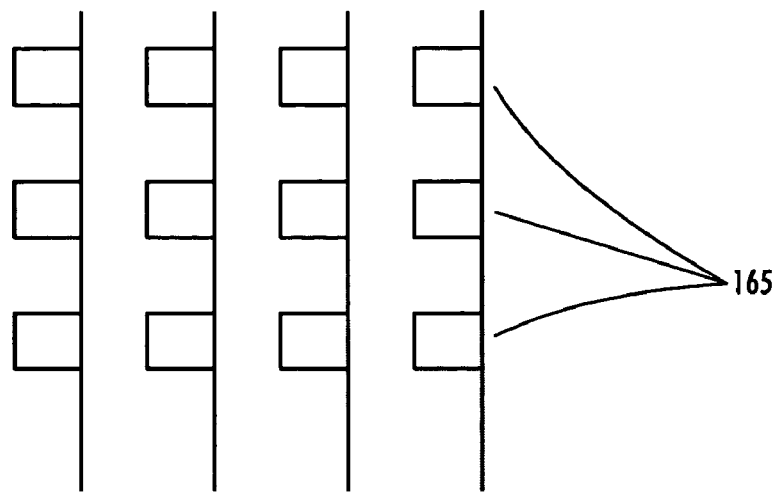
FIG. 35 is a block diagram showing the top view of the select lines of the active matrix driver layer circuit design in an embodiment of the invention.
Figure 36:
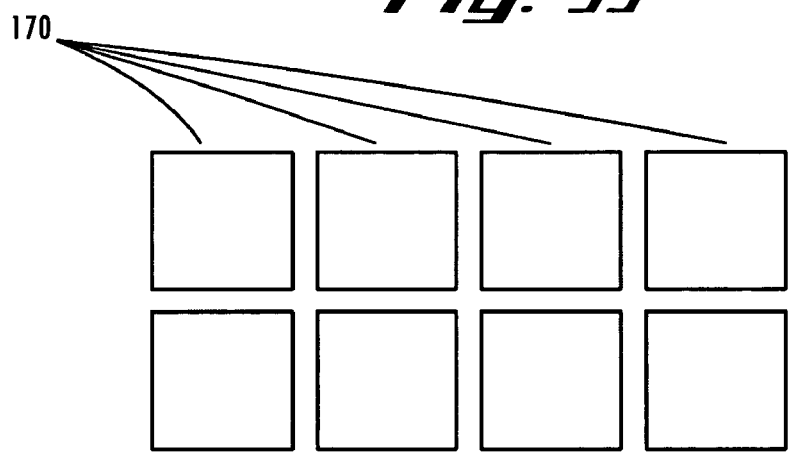
FIG. 36 is a block diagram showing the top view of the pixel electrodes of the active matrix driver layer circuit design of the invention.
Figure 37:
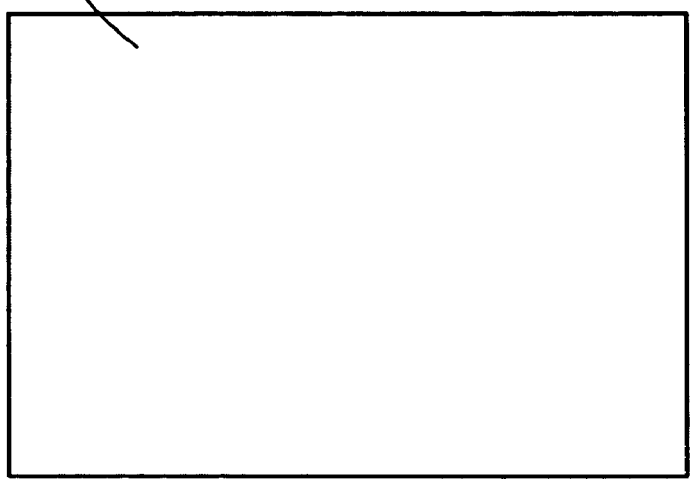
FIG. 37 is a diagram showing the top view of the dielectric layer of the active matrix driver layer circuit design in an embodiment of the invention.
Figure 38:
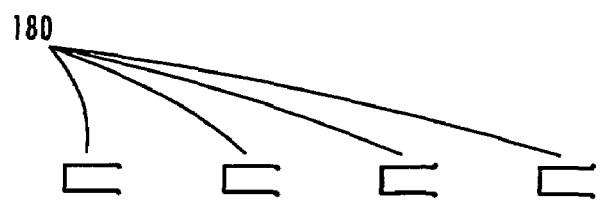
FIG. 38 is a diagram showing the top view of the drain lines of the active matrix driver layer circuit design in an embodiment of the invention.
Figure 39:
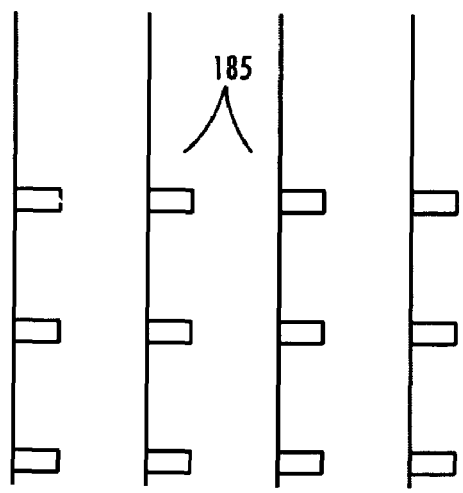
FIG. 39 is a diagram showing the top view of the data lines of the active matrix driver layer circuit design in an embodiment of the invention.
Figure 40:
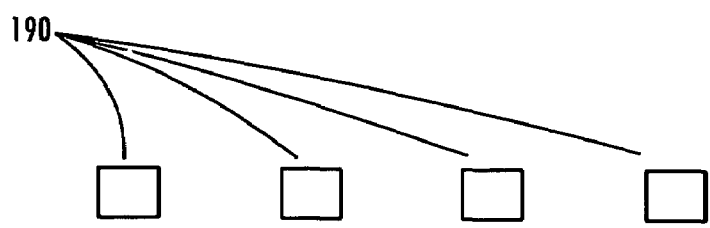
FIG. 40 is a block diagram showing the top view of the transistor array of the active matrix driver layer circuit design in an embodiment of the invention.
Figure 41:
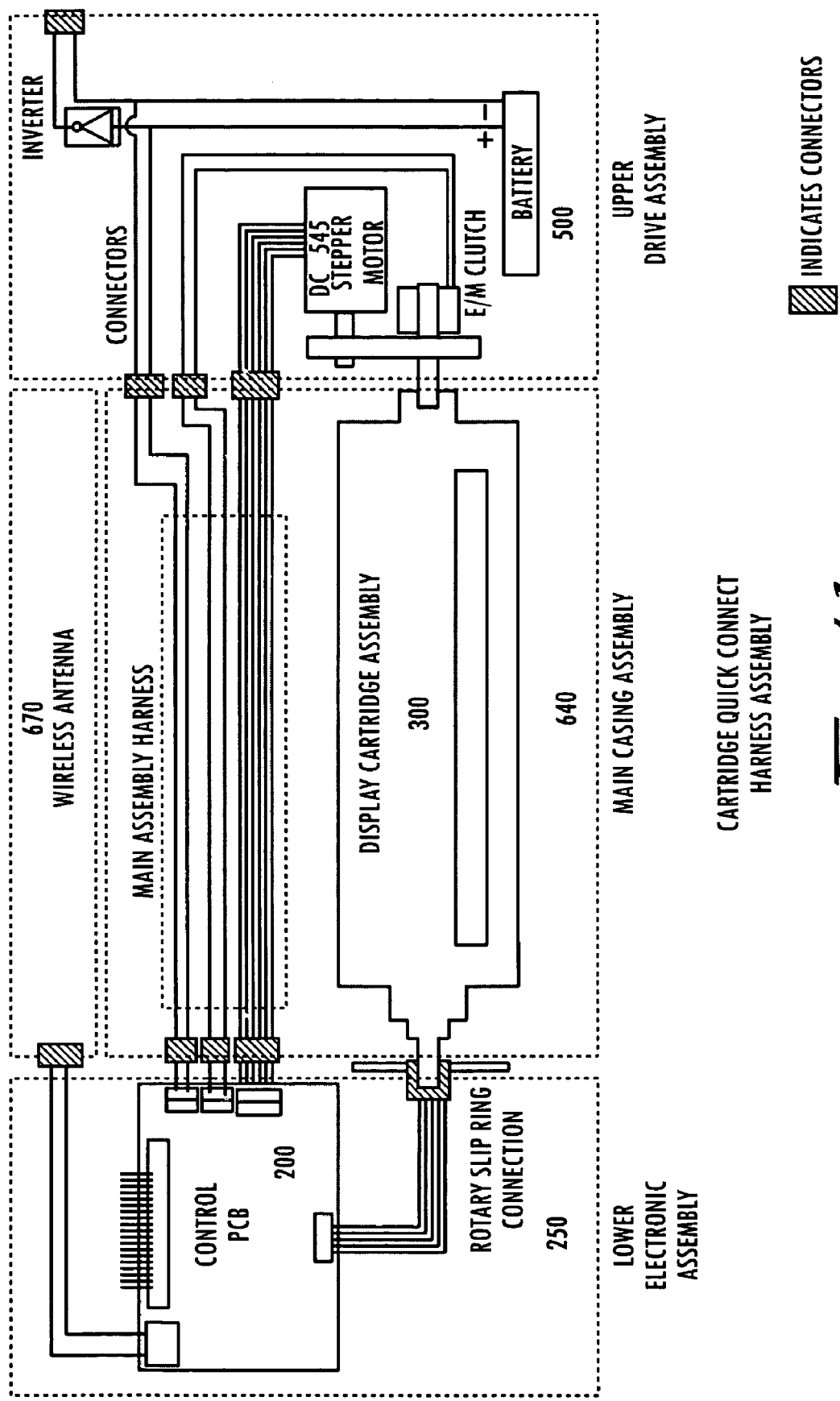
FIG. 41 is a logical schematic diagram of the internal wiring harness used to transmit data and power for operation of the portable retractable flexible digital display in an embodiment of the invention.
Figure 42A:
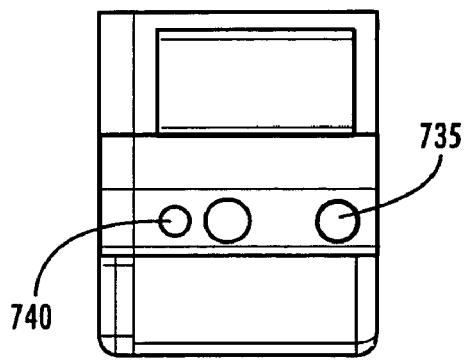
FIG. 42A is a front view showing the mounting point to the main housing of Radio Frequency (RF) sensor pickup assembly (left) in an embodiment of the invention.
Figure 42B:
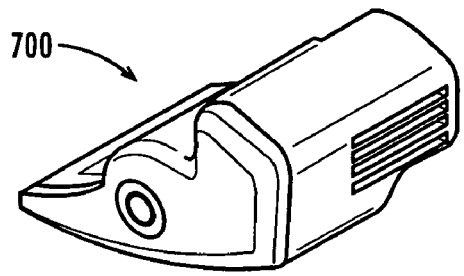
FIG. 42B is a bottom side perspective view of the RF sensor pickup assembly (left) in an embodiment of the invention.
Figure 42C:
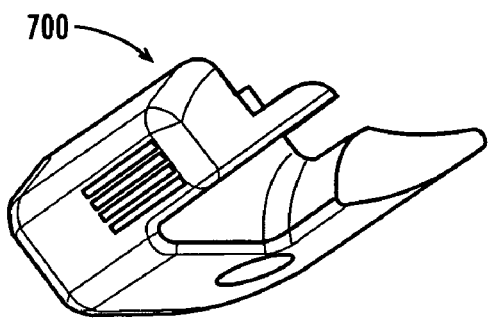
FIG. 42C is a top side perspective view of the RF sensor pickup assembly (left) in an embodiment of the invention.
Figure 42D:
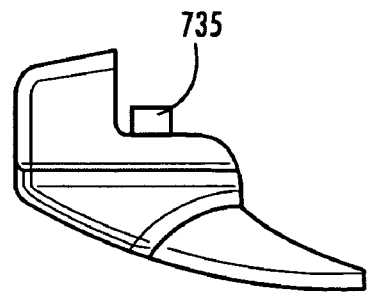
FIG. 42D is a front view of the RF sensor pickup assembly (left) in an embodiment of the invention.
Figure 42E:
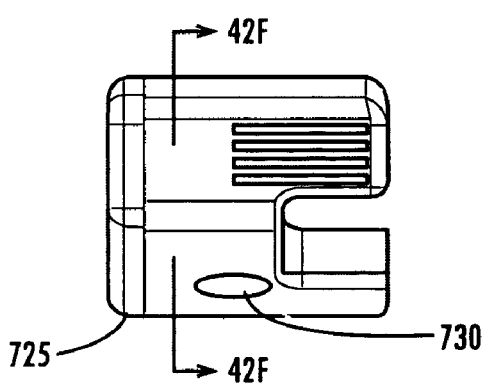
FIG. 42E is a side view of the RF sensor pickup assembly (left) in an embodiment of the invention.
Figure 42F:
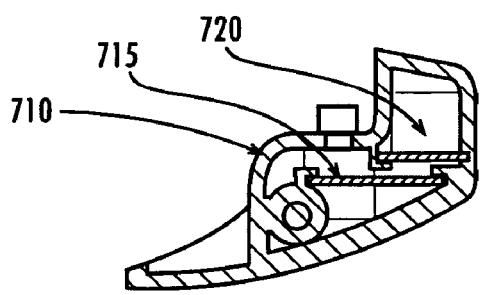
FIG. 42F is a sectional view along line D-D of FIG. 42E of the RF sensor pickup assembly (left) in an embodiment of the invention.
Figure 42G:
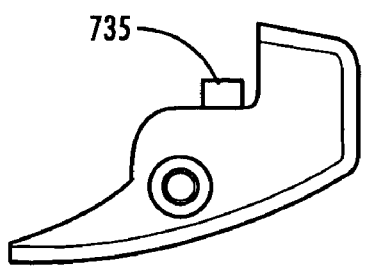
FIG. 42G is a bottom side view of the RF sensor pickup assembly (left) in an embodiment of the invention.
Figure 46:
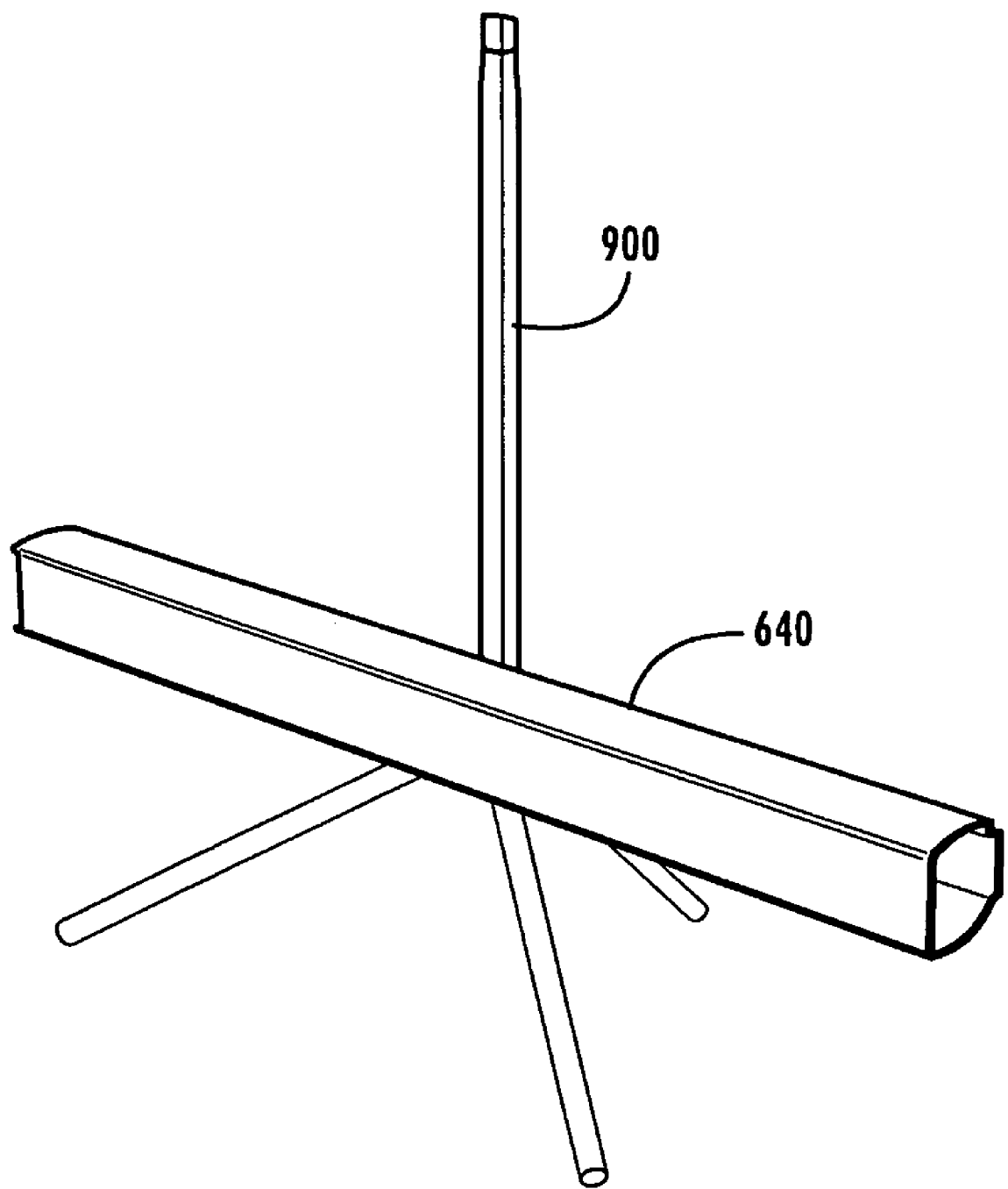
FIG. 46 is front perspective view of a tripod bracket assembly in an embodiment of the invention.

Referring to FIG. 29A, in embodiments of the invention, the retractable flexible digital display assembly 400 is of a size and shape that can be utilized as a scaled set of drawings by professionals in their respective disciplines to drawings in an industry standard size (ANSI Architectural 42" Wide by 30" Tall). In another embodiment, the retractable flexible digital display assembly 400 is smaller (ANSI Engineering C-Size 22" Wide by 17" Tall), so that the display may be utilized by persons not required to work with drawings of an architecture industry standard size. Accordingly, it will be appreciated that the device of the present invention can be scaled to the size of a variety of uses. As an illustration, a smaller device with a longer screen compared to traditional laptops and like display devices, may be provided for permitting documents, including blueprints, maps, books, publications (e.g. newspapers, magazines and the like), and other exemplary graphical and/or textual materials, to be viewed by a person on an airplane or in other limited spaces for which a portable display is desired. The advantages of the present invention described in the illustrative embodiment for larger screen displays would still remain applicable to smaller, scaled embodiments. Further, it will be appreciated that larger screens and/or alternative housings are also contemplated by the present invention.

Referring again to FIGS. 18 and 19 and to FIGS. 29A-29G, in an embodiment the retractable flexible digital display assembly 400 includes protective lower layer 420 and display handle 405 built as a shallow tray with a flexible wiring harness 410 running along one or both edges. The flexible display assembly tray 400 contains the active matrix display layer 440 between the protective layers 415, 420.

The display handle 405 includes a sealed and rubberized keypad 408 used as a user interface. In some embodiments, the flexible display assembly 400 also includes display size calibration sensors 425 that allow the width of the flexible display assembly 400, when partially retracted, to be calculated by the viewing device 100 so that the position of a radio frequency transmitter pen is sensed relative to the partially retracted flexible display assembly 400.

Figure 19:
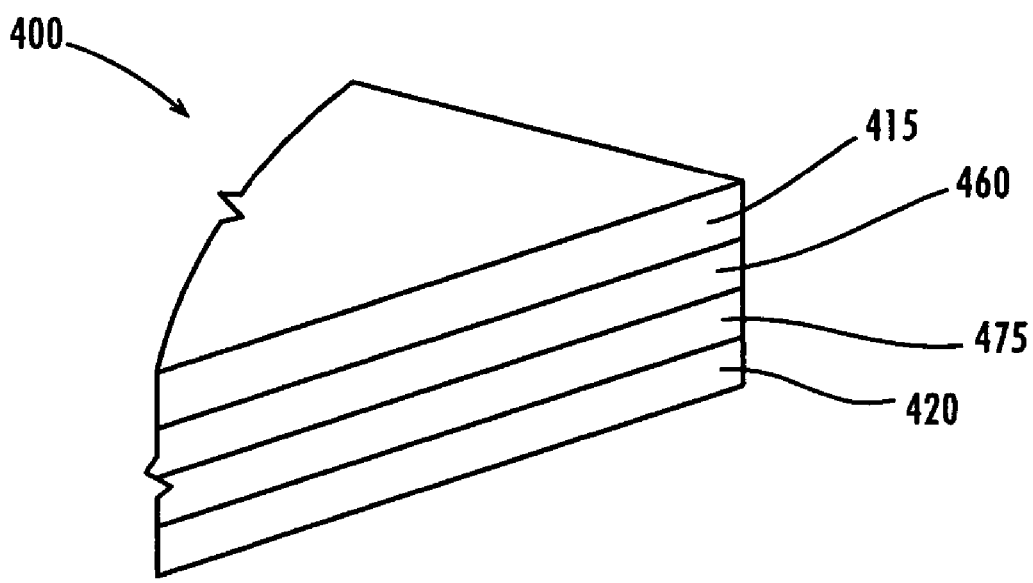
FIG. 19 is a side perspective cut away view of a retractable flexible digital having a microcapsule display layer and flexible active matrix driver layer and protective layers associated therewith in an embodiment of the invention.

In another embodiment, shown in FIGS. 19, 30 and 31 the flexible display assembly tray 400 includes display layer 460 and the active matrix driver layer 475 between the protective layers 415, 420.

Referring again to FIG. 1, with continuing reference to FIGS. 29A-29G, and further reference to FIGS. 23-26, the edge of the retractable flexible digital display assembly 400, which is more rigid than the flexible upper protective layer 415 or the lower protective layer 420, attaches to the display reel shaft 320 and is mounted between the display reel shaft 320 and the display reel retaining plate 321. The rigid mounting edge includes multiple display tray alignment slots 430 and tray locking slots 437 along the edge between display reel shaft 320 and the display reel retaining plate 321. Display tray assembly holes 435 on the display tray 400 rigid edge allow the display reel retaining screws through screwholes 322 to pass through the mounting holes of display tray 400 reel mounting edge without interfering with the operation of the display assembly 400.

Referring again to FIG. 1, with continuing reference to FIGS. 29A-29G, and further reference to FIGS. 23-26, the viewing device 100 includes three main section assemblies including the lower casing assembly 250 which houses the electronics responsible for display the image on the flexible display, the center section storage housing assembly 640 which holds the display cartridge assembly 400 and the upper casing assembly 500 which houses the drive mechanisms for retracting the flexible display into the display cartridge assembly 400 and the AC/DC power interfaces including device battery 523 and power inverter 547. Each of the three section assemblies 250, 500 and 640 contains an outer housing extrusion. The lower casing extrusion outer housing 253 and the upper casing extrusion outer housing 503 attach at the ends of the main casing extrusion outer housing 640 with three assembly mounting screws 280 into the main extrusion outer housing mounting screw taps 641. Accordingly, it will be appreciated that the casings are separable for one another for increasing the ease of assembly of the apparatus of the invention and servicing of replacing parts within a respective assembly without replacing the entire device.

Figures 15A, 15B:
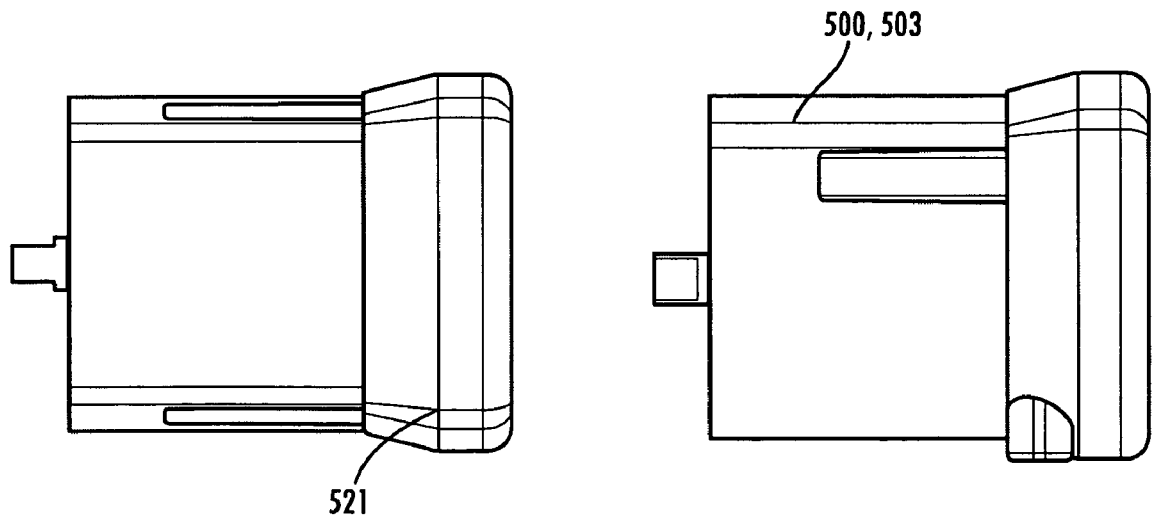
FIG. 15A is a top view showing the upper casing in an embodiment of the invention.
FIG. 15B is a side view showing the upper casing in an embodiment of the invention.
Figure 15C:
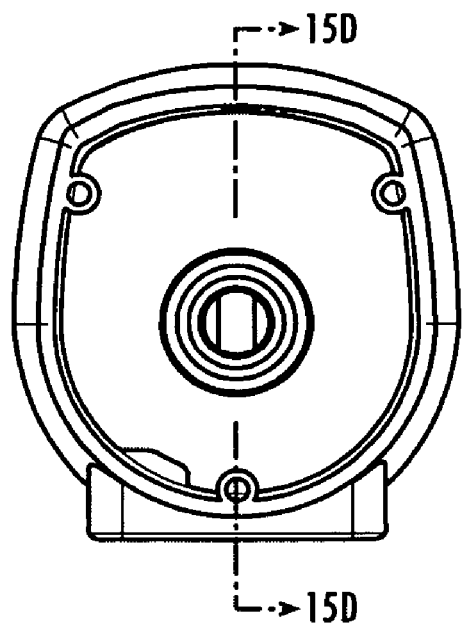
FIG. 15C is a cross-sectional view showing the upper casing outer housing in an embodiment of the invention.
Figure 15D:
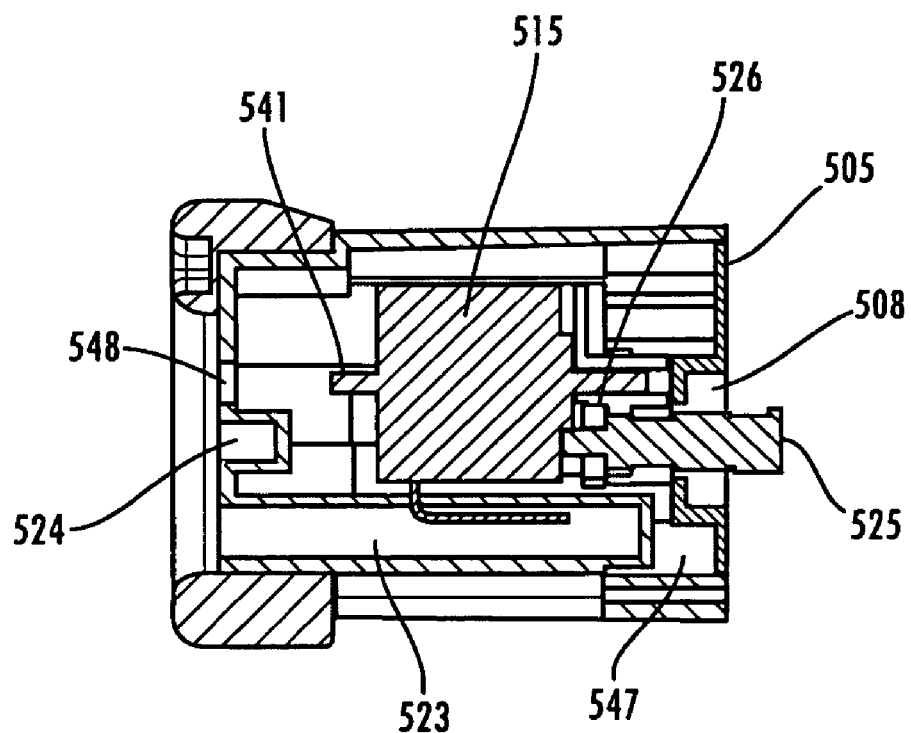
FIG. 15D is a sectional view along line A-A showing the upper casing in an embodiment of the invention.
Figure 16:
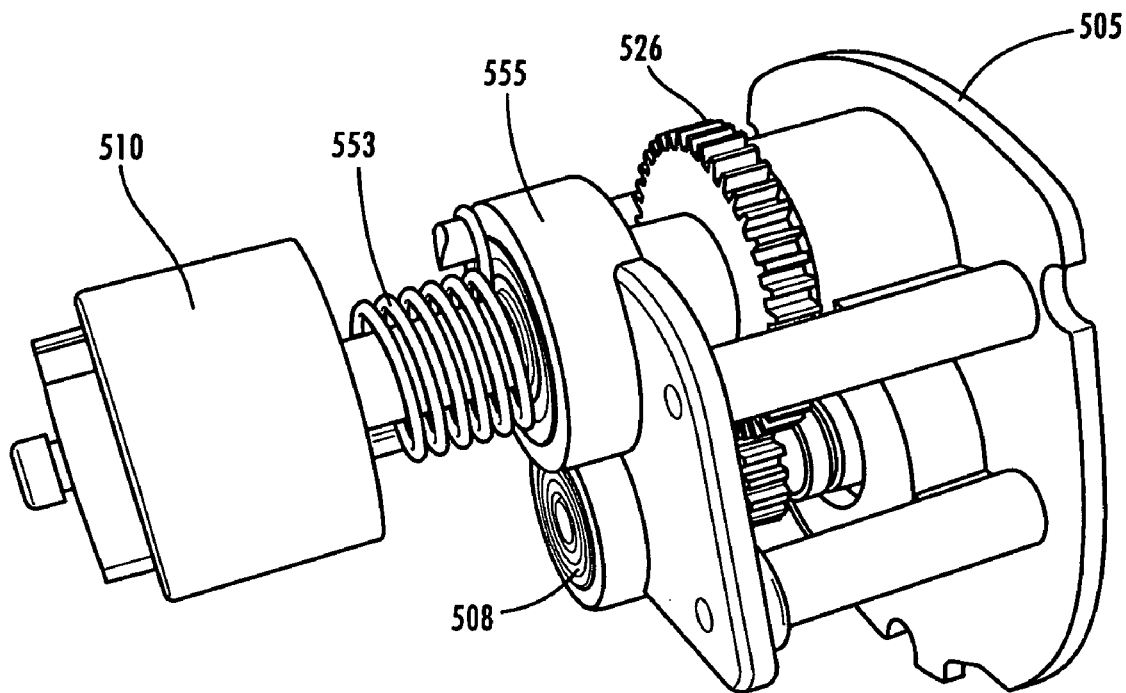
FIG. 16 is a perspective view showing a spring drive and clutch in an embodiment of the invention.
Figure 17:
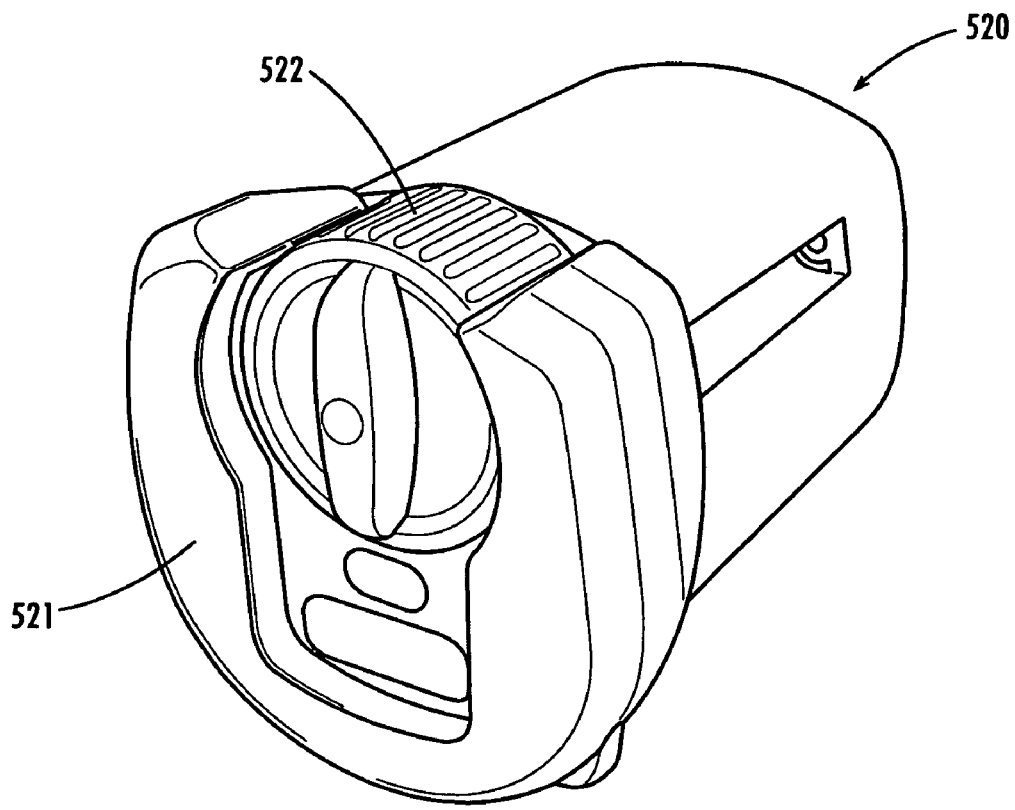
FIG. 17 is a perspective view showing the upper casing outer housing with a manual thumb drive wheel in an embodiment of the invention.

As shown in FIGS. 10C, 15A and 15B, the lower casing extrusion outer housing 253 bumper assembly 255 and the upper casing extrusion outer housing 503 bumper assembly 521 are molded elastomeric bumpers designed and engineered to absorb much of the shock in the event that the viewing device 100 is dropped.

Referring to FIGS. 10A-10E, the lower casing assembly 250 includes a lower casing outer housing extrusion 253 to house the main electronics PCB board 270, a lower casing elastomeric bumper 255 that provides for shock protection if the viewing device 100 is dropped, an input/output panel 260 to plug in external peripherals and a stepper motor control PCB board 275 for controlling the stepper motor for embodiments that use a stepper motor 515.

Figure 11A:
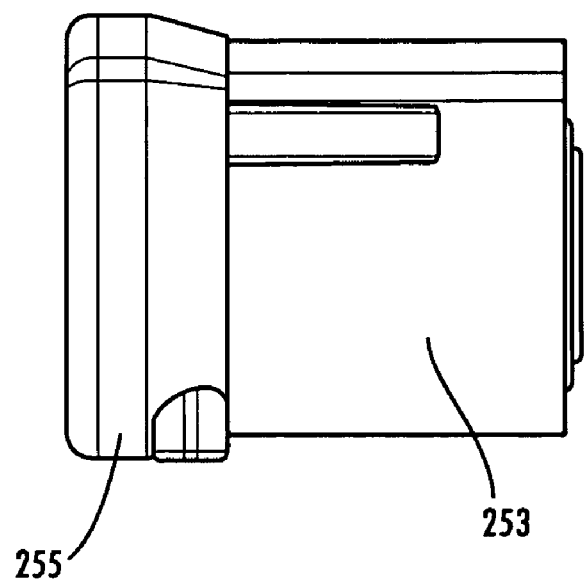
FIG. 11A a side view showing the lower casing assembly in an embodiment of the invention.
Figure 11B:
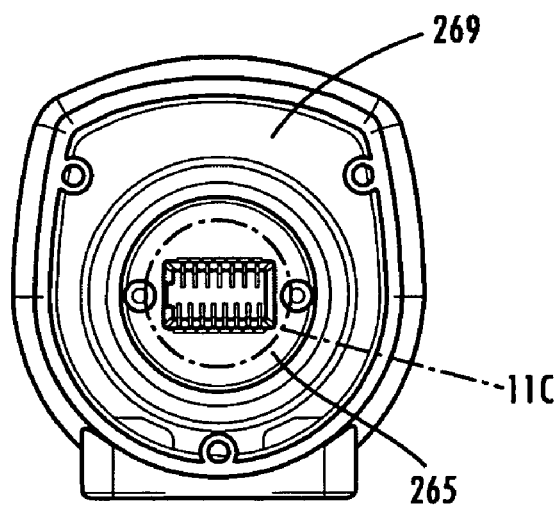
FIG. 11B a cross-sectional view showing the lower casing assembly including the quick connect slipring receptacle housing in an embodiment of the invention.
Figure 11C:
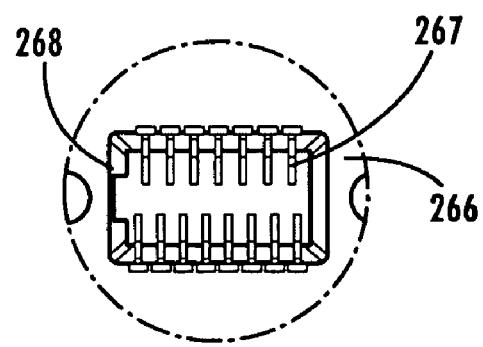
FIG. 11C a detail view along A showing the quick connect slipring receptacle housing in an embodiment of the invention.
Figure 12:
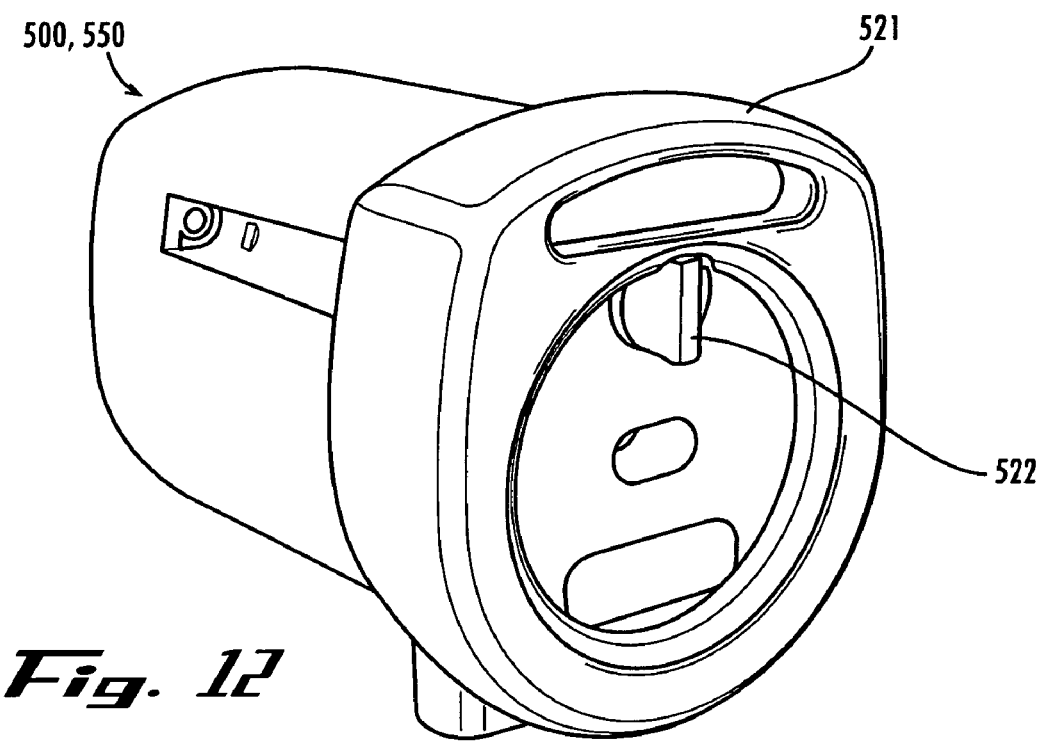
FIG. 12 is a perspective view showing the upper casing assembly including the elastomeric bumper and the manual thumb screw retraction mechanism in an embodiment of the invention.
Figure 13:
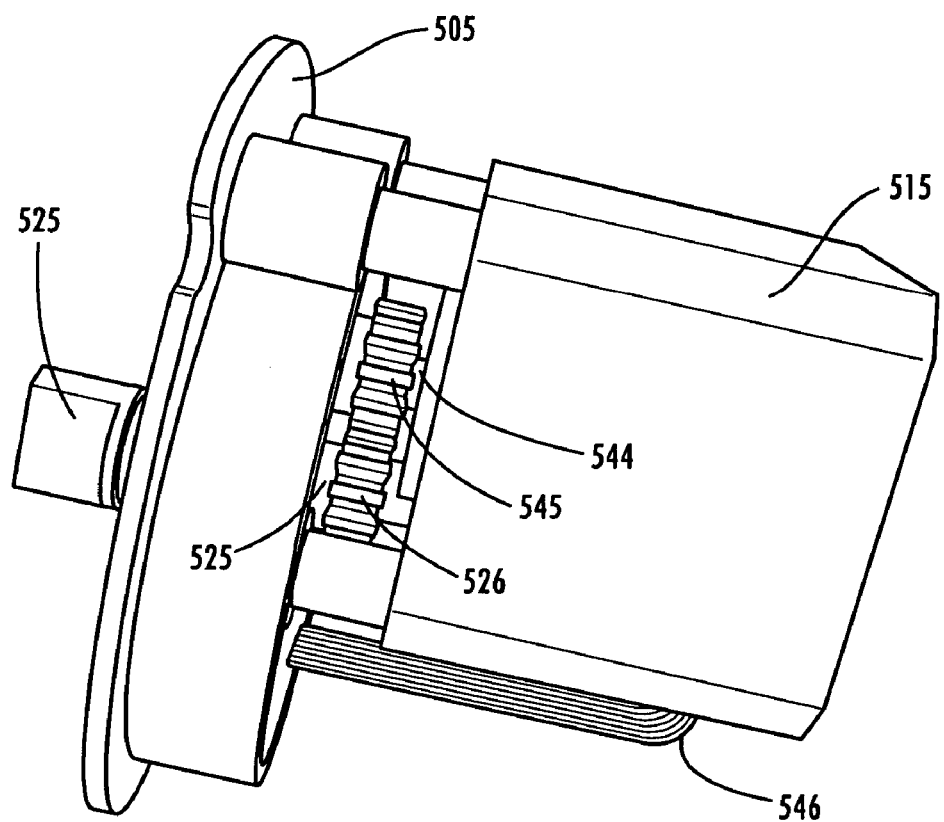
FIG. 13 is a side perspective showing a motorized embodiment of the drive mechanism of the invention.
Figure 14A:
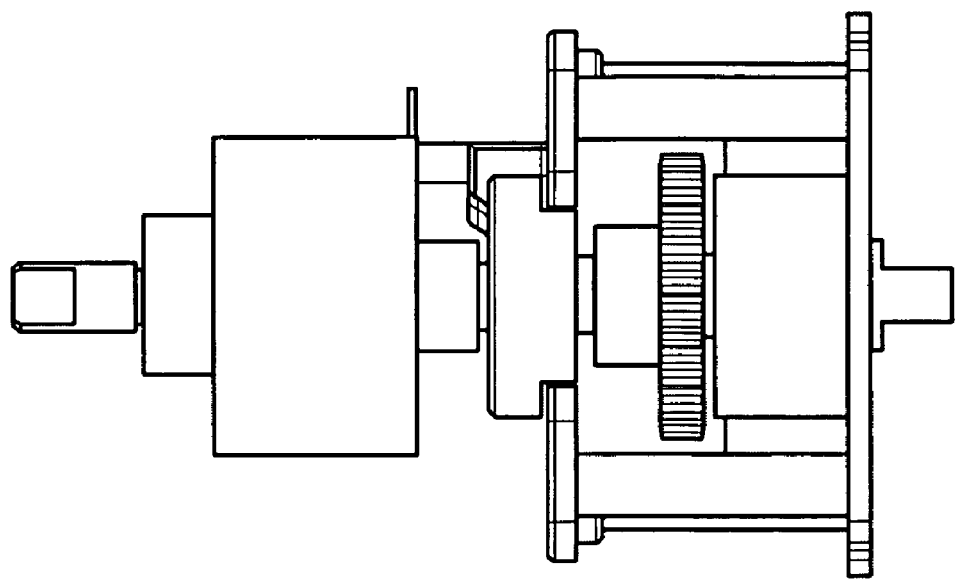
FIG. 14A is a top view showing a thumb drive and clutch embodiment of the invention.
Figure 14B:
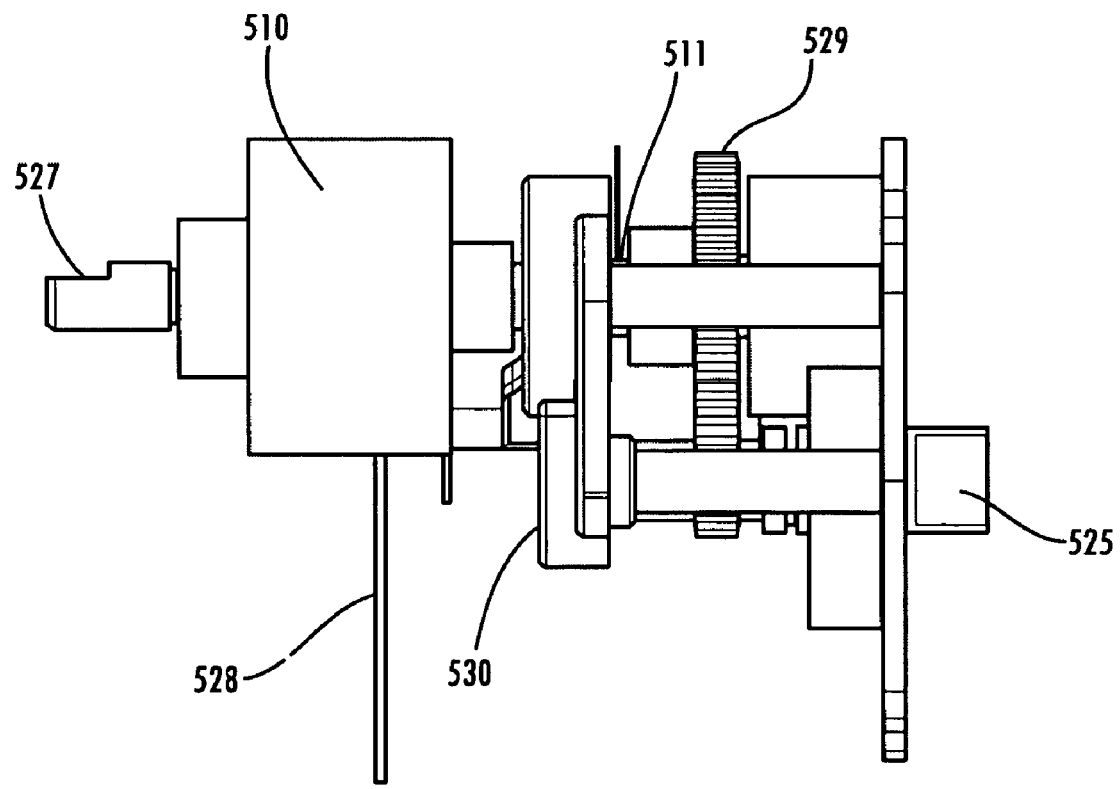
FIG. 14B is a side view showing a thumb drive and clutch embodiment of the invention.
Figure 14C:
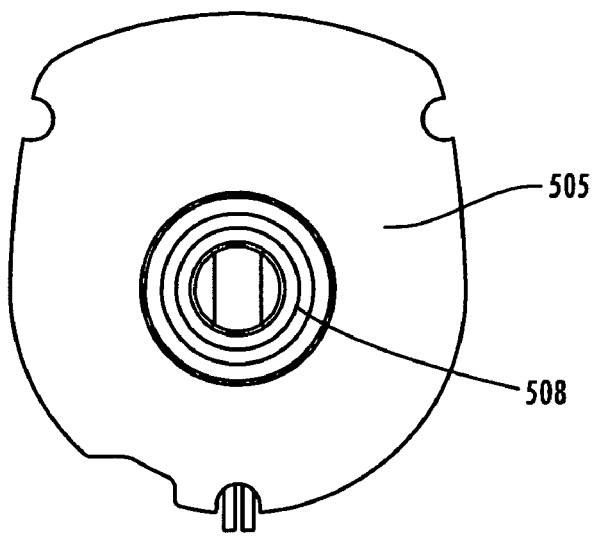
FIG. 14C is a cross-sectional view showing the thumb drive and clutch version of the invention.

Referring to FIGS. 11A-11C, the female assembly coupling 265 that interfaces the display cartridge Slipring quick connect 301 (FIG. 22) is also on the lower casing assembly 250. The lower casing assembly 250 is attached to the center section storage housing assembly 640 by assembly mounting screws 280.

Figure 22:
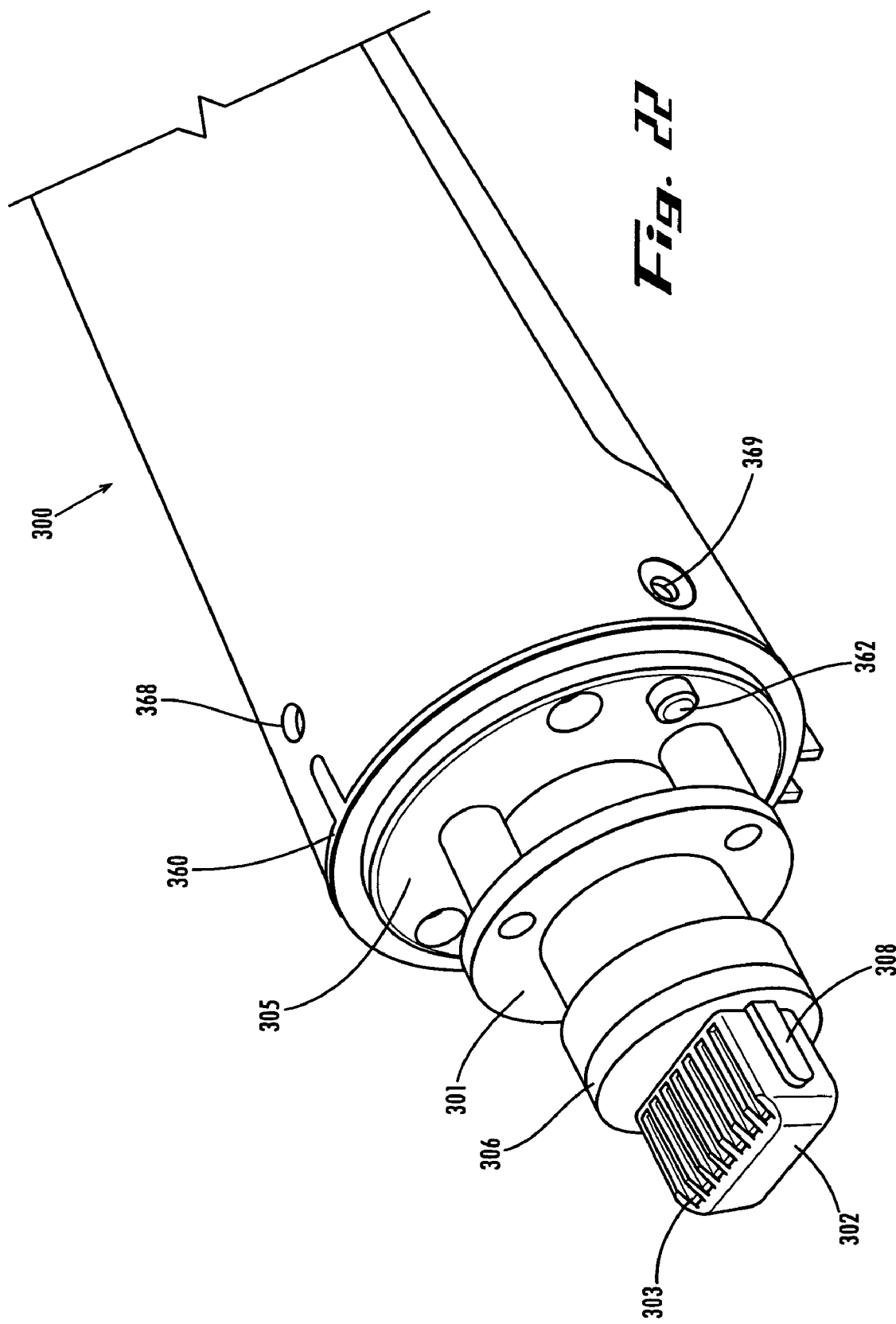
FIG. 22 is a perspective view of the quick connect male coupling with alignment key and slipring assembly and mount plate attached to the display cartridge spooling mechanism in an embodiment of the invention.
Figure 23:
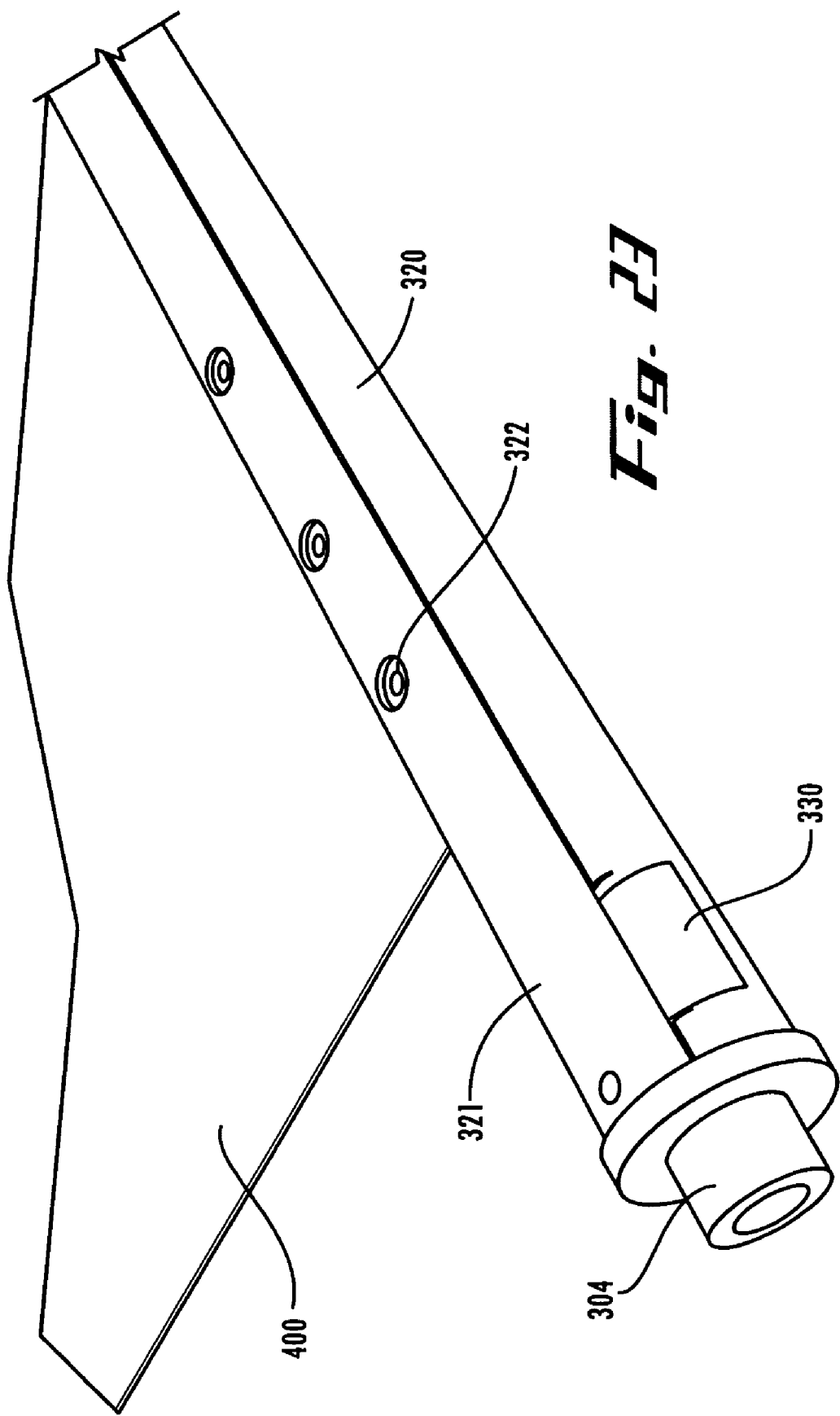
FIG. 23 is a perspective view of the display reel of the display cartridge spooling mechanism with the flexible display in an embodiment of the invention.
Figure 27:
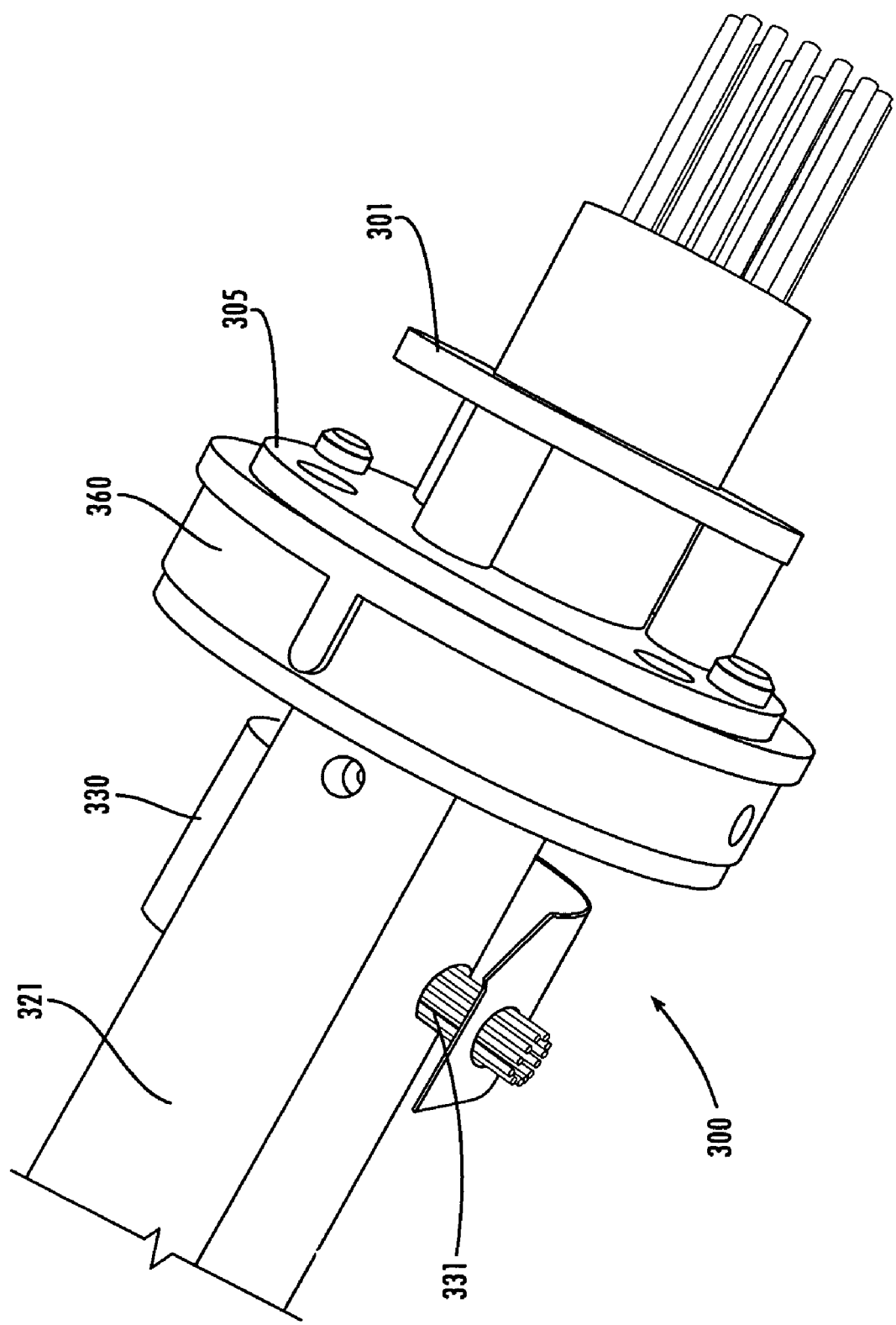
FIG. 27 is a perspective view showing the display reel flex circuit aperture connecting the wiring of the slipring mechanism assembly and the flex circuit jumper in an embodiment the invention.

Referring to FIGS. 11B and 11C, the female assembly coupling 265 is attached to the lower casing support plate 269. The coupling receptacle housing 266 includes a coupling alignment keyway 268 and cantilever contact springs 267. Referring to FIG. 22 the coupling alignment key 304 of the male quick connect slipring coupling 302 aligns the cantilever contact pins 303 with the cantilever contact springs 267 inside the female coupling receptacle housing 266. The male quick connect slipring coupling also includes a connector foam dust seal 306 to keep dirt, dust and other obstacles from obstructing the electrical contacts made between the cantilever contact springs 267 and the cantilever contact pins 303.

Figure 49:
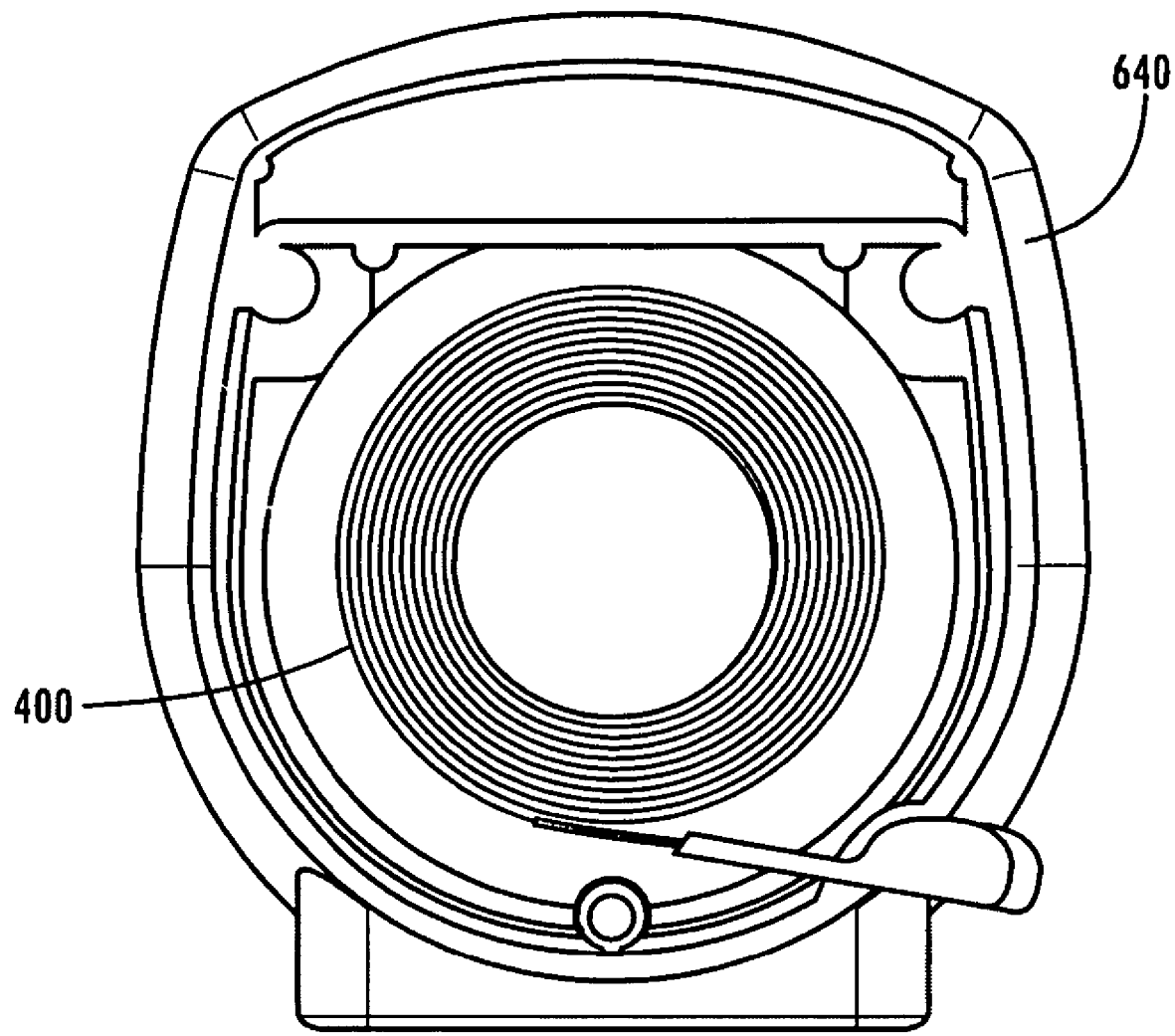
FIG. 49 is a cross-sectional view of a flexible display retracted within a housing of an embodiment of the invention.

An example of the retractable flexible digital display assembly 400 retracted within portable weatherproof shock resistant storage housing of central section 640 is shown in FIG. 49.

Referring to FIGS. 5A-5E, within the portable weatherproof shock resistant storage housing of central storage casing 640 a card reader slot 630 is provided that is appropriately sized to accommodate a media device 635 enclosed within a weather resistant panel 631. The media storage device 635 includes, in non-limiting examples, a magnetic disc, compact flash card, Secure Digital (SD) cards, and the like. Other components, not shown, that serve to secure the media storage device 635 within the card reader slot 630 and the center casing housing 640 are preferably located within the weather resistant panel 631 to transfer data between the media device 635 and the card slot reader 630.

Figure 2:
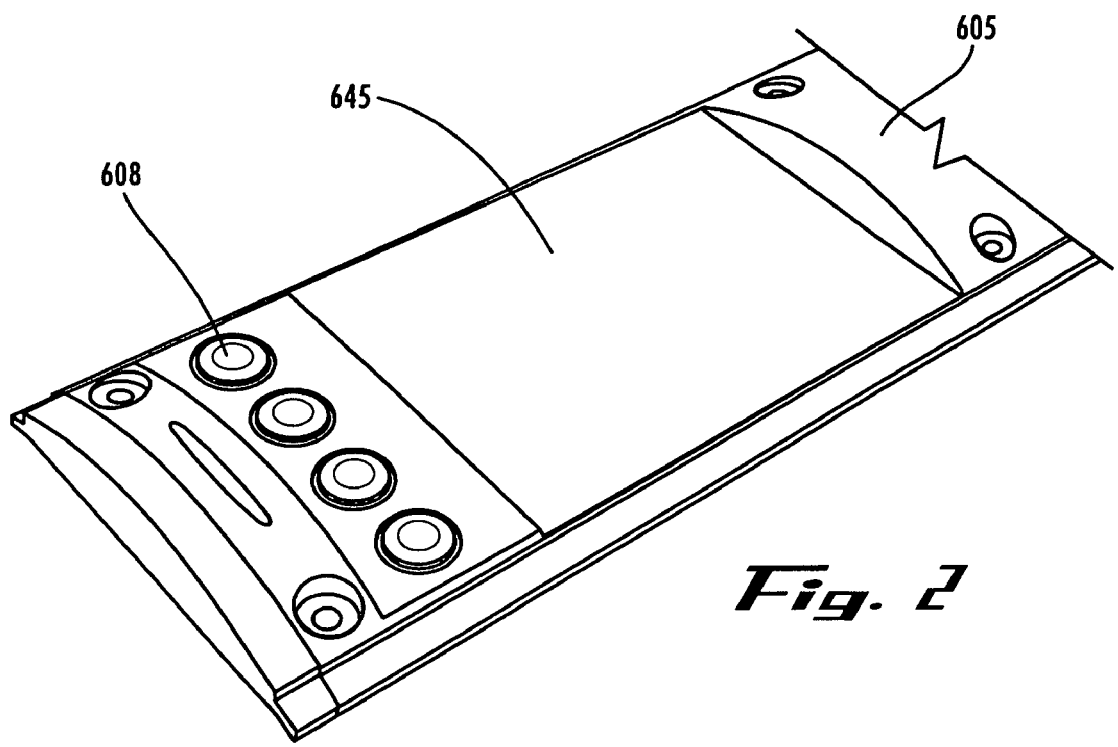
FIG. 2 is a perspective view from above of the user interface bezel assembly with touch screen and programmable rubberized keypad in an embodiment of the invention.
Figure 3:
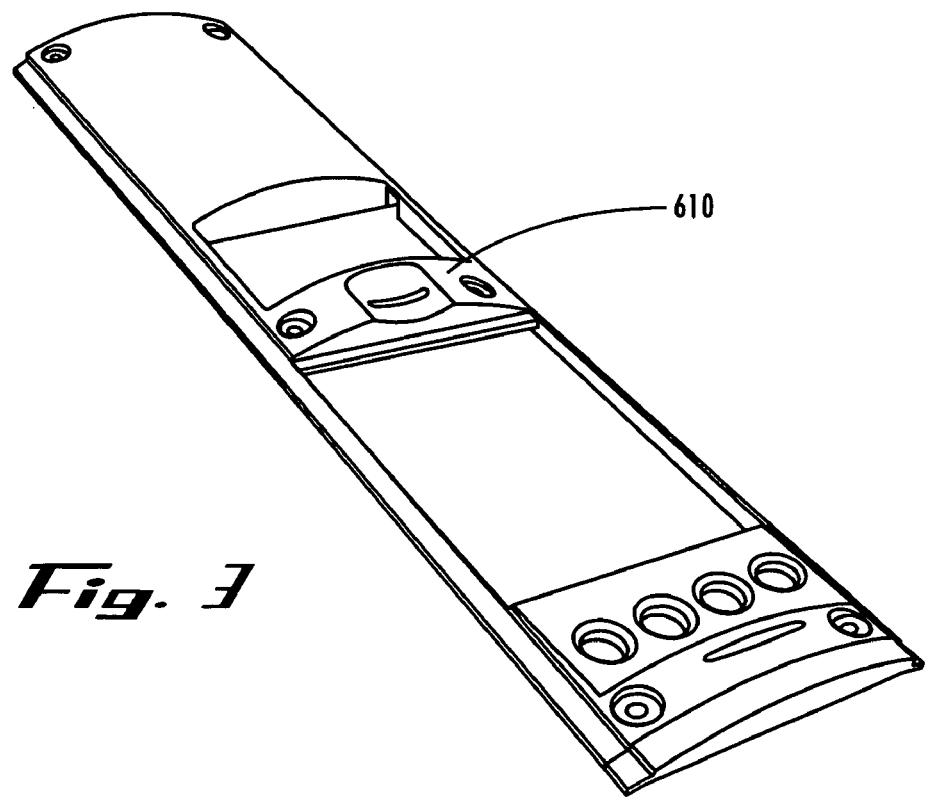
FIG. 3 is a perspective view of the user interface bezel assembly with aperture for biometric security interface in an embodiment of the invention.
Figure 4A:
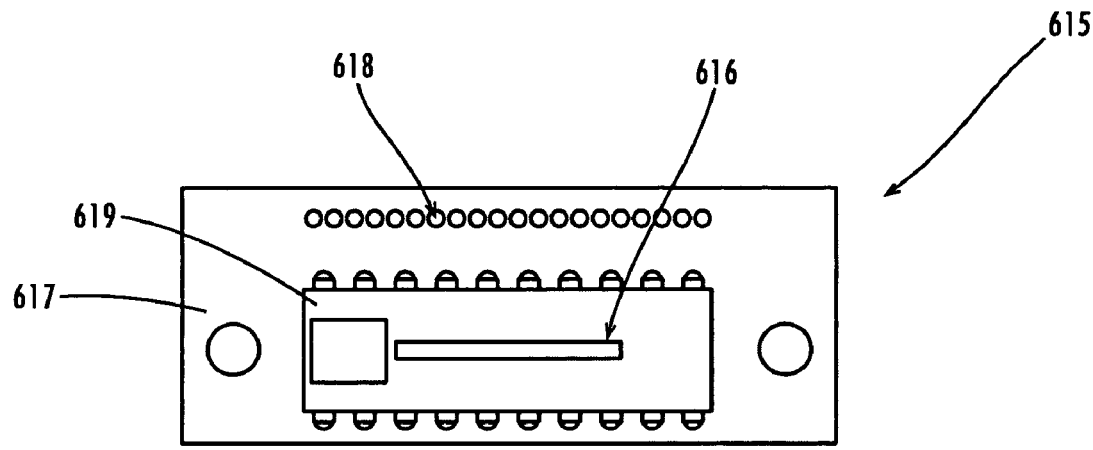
FIG. 4A is a top side view showing the biometric sensor PCB assembly in an embodiment of the invention.
Figure 4B:
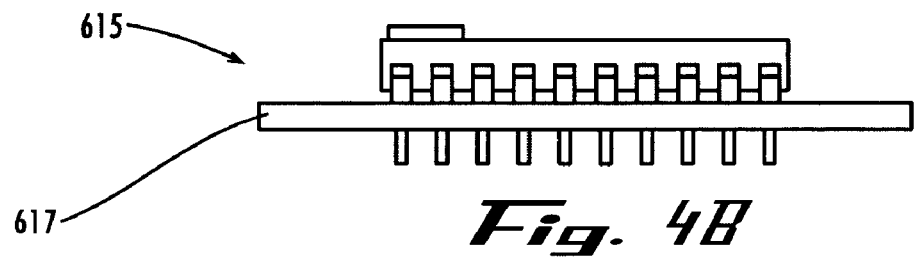
FIG. 4B is a right side view showing the biometric sensor PCB assembly in an embodiment of the invention.
Figure 4C:
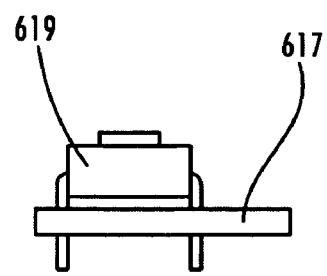
FIG. 4C is a front side view showing the biometric sensor PCB assembly in an embodiment of the invention.
Figure 5A:
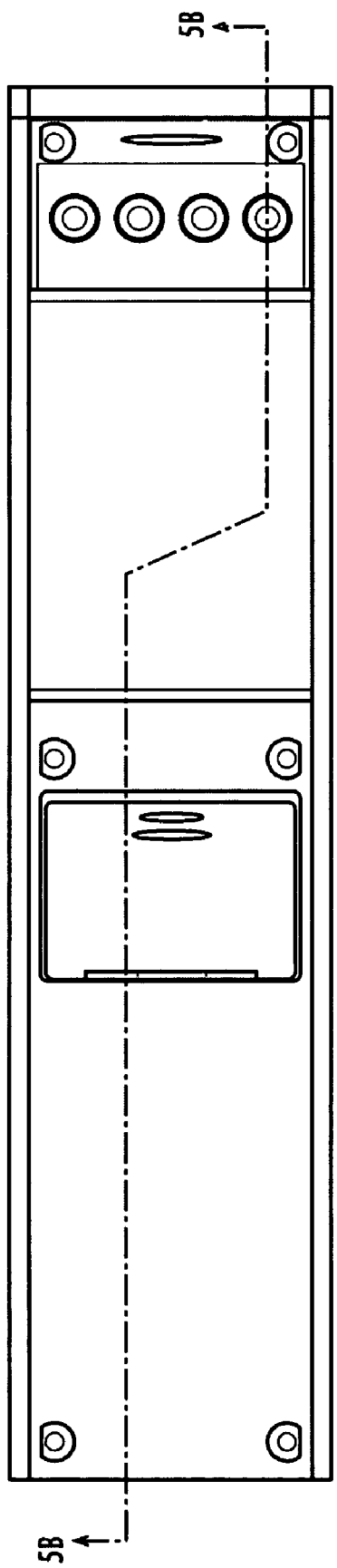
FIG. 5A is a top plan view showing the user interface bezel assembly with the flash-card accessory module in an embodiment of the invention.
Figure 5B:
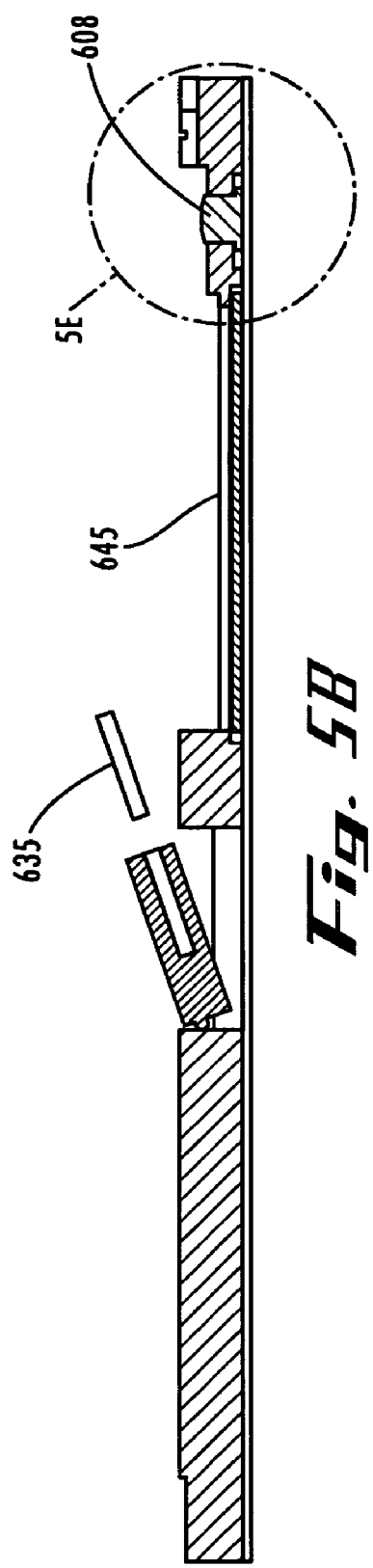
FIG. 5B is a sectional view along line A-A of FIG. 5A showing the user interface bezel assembly with the flash-card accessory module in an embodiment of the invention.
Figure 8:
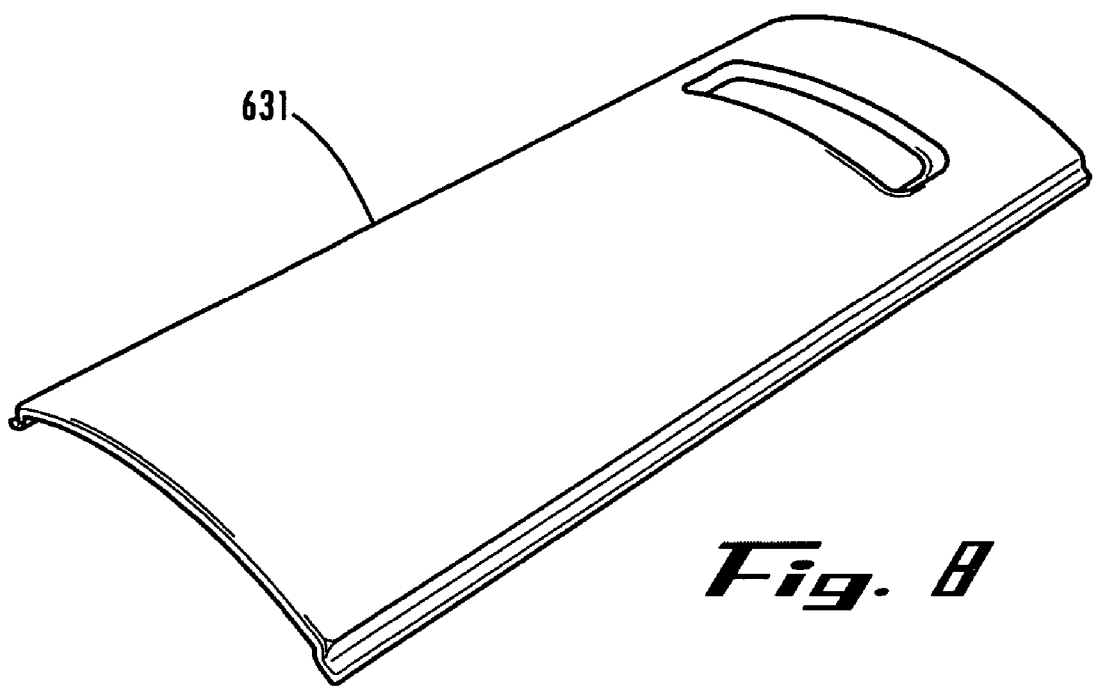
FIG. 8 is a perspective view showing the main extrusion outer housing control panel access door in an embodiment of the invention.
Figure 9:
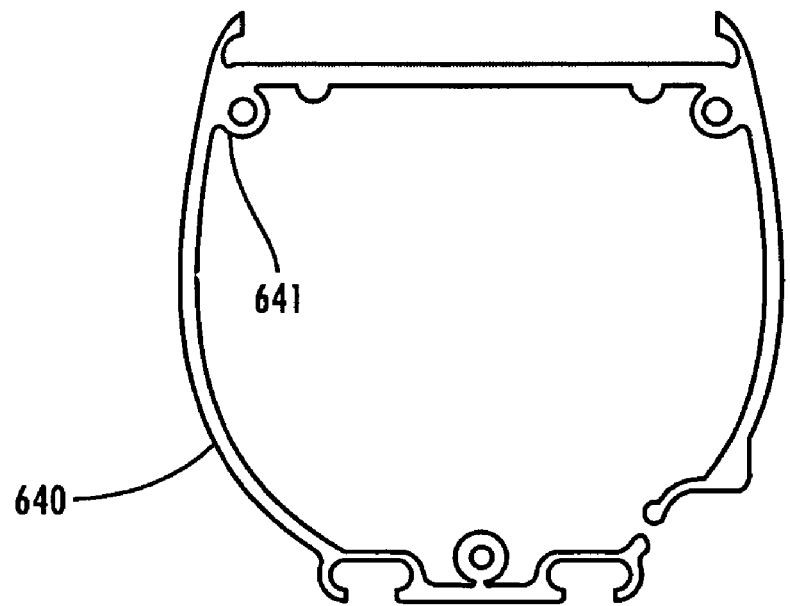
FIG. 9 is a cross-sectional end view showing the main extrusion outer housing in an embodiment of the invention.

Referring to FIG. 2, the central casing outer housing 640 has a programmable touch screen display 645 and user programmable sealed rubberized buttons 608 used as a user interface behind a weather resistant panel 631. The touch screen programmable display 645 is surrounded by the user interface bezel assembly seal 606 (FIG. 5E) within the user interface bezel assembly 605. The programmable touch screen display 645 is used to interface with documents, drawings, files and the like, stored on the media device 635. A media storage device 635 is typically capable of storing thousands of drawings and documents. Users interacting with the programmable touch screen display 645 are able to quickly switch between any drawing or document stored on the media storage device 635 to be displayed on the retractable flexible digital display assembly 400.

Referring to FIG. 49, a side cut away view of a non-limiting embodiment of the retractable flexible digital display assembly 400 is shown retracted into the central casing portable weatherproof shock resistant storage housing 640. A side cut away view of a non-limiting embodiment of the retractable flexible digital display assembly 400 is shown extended outside the portable weatherproof shock resistant storage housing in FIG. 1 for use in displaying drawings.

In an embodiment show in FIG. 18, the retractable flexible digital display assembly 400 has a flexible active matrix (OLED) RGB color display 440. In an alternative embodiment, as shown in FIG. 19, a flexible microcapsule display layer 460 is operatively, electrically and mechanically connected to the central casing portable weatherproof shock resistant storage housing 640. The retractable flexible digital display assembly 400 has a transparent protective weather resistant upper layer 415. The flexible active matrix (OLED) RGB color display 440 or in an alternative embodiment a flexible microcapsule display layer 460 also has a protective weather resistant lower layer 420 oppositely disposed relative to the transparent weather resistant upper protective layer 415. Accordingly, the upper transparent protective layer 415 is capable of allowing drawings and documents displayed on the flexible active matrix (OLED) RGB color display 440 or in an alternative embodiment a flexible microcapsule display layer 460 to be seen by the user.

In a non-limiting embodiment of the flexible active matrix (OLED) RGB color display 440 or a flexible microcapsule display layer 460, both the flexible active matrix (OLED) RGB color display layer 440 or a flexible microcapsule display layer 460 are available in the marketplace.

As described previously, the retractable flexible digital display assembly 400 is flexible. The protective weather resistant upper and lower layers 415, 420 affixed to the flexible active matrix (OLED) RGB color display 440 or in an alternative embodiment, a flexible microcapsule display layer 460 maintain the flexibility of the retractable flexible digital display assembly 400. A flexible and pliable adhesive adheres the weather resistant layers 415, 420 and the flexible active matrix (OLED) RGB color display 440, or, in an alternative embodiment, a flexible microcapsule display layer 460 together.

As described previously, the viewing device 100 is lightweight. The viewing device 100 is capable of being transported from one job to another. The viewing device 100 is lighter and thus more portable than conventional display devices. Due to the light weight of the display device 100 and reducing the use of moving parts there is an increase in durability. For example, a viewing device 100 carried with the retractable flexible digital display assembly 400 retracted, as shown in FIG. 49, has a significantly reduced probability that dropping the viewing device 100 would render the viewing device 100 inoperable.

As described previously, the viewing device 100 is network capable, including LAN and WAN (such as the Internet) networks. In one non-limiting embodiment, a media storage device 635 capable of connecting to a wide variety of networks is incorporated into the viewing device 100 within the card reader slot 630. The viewing device also includes, in another non-limiting embodiment, a network adapter directly built onto the processor board 270.

In one embodiment, shown in FIGS. 7A and 7B, the viewing device 100 includes a wireless networking interface assembly 670 with an antenna that boosts the reception of the signals traveling to and from the viewing device 100. In this embodiment, the center section molded fascia panel 620 includes a wireless antenna recess 690 that the wireless Polyflex or rigid antenna 680 could be inserted. The wireless antenna 680 fits into the antenna recess 690 is covered by a die-cut open cell urethane foam spacer 685. The wireless antenna 680 connects to the main electronic PCB board 270 via a jumper circuit 675.

Having described the components of the viewing device 100, the operation of the viewing device 100 will now be described.

Drawing and document data is processed by the electronics within the device 100 so as to cause the drawing or document to be displayed on the flexible active matrix (OLED) RGB color display 440 or in an alternative embodiment a flexible microcapsule display layer 460 of the retractable flexible digital display assembly 400. A user interacts with a programmable touch screen display interface 645 behind a weather resistant panel 631. The programmable touch screen display 645 is used to interface with drawings held on the media storage device 635. For example, a user may switch between drawings and documents referred to within a drawing by simply touching a programmable touch screen 645.

In alternative embodiments, either replacing or as a supplement to the touch screen controls, other wired and wireless control devices, including peripheral keyboards, peripheral touch-screen units, PDAs, computers, joystick and mouse controllers, speech command software and the like, may be used to control the images of the display.

The viewing device 100 has several benefits when compared to conventional paper blueprints or paper reproductions of blueprints. For example, blueprints tear and are subject to damage when carried between locations within a job site. The retractable flexible digital display assembly 400 is more durable because of the protective weather resistant layers 415, 420. Drawings and documents are not subject to degradation after being used or transported. Additionally, drawings and documents can be maintained within a central repository for a project and automatically updated to specific or groups of viewing devices 100 via networking technologies. Updates to software responsible for displaying drawings, the programmable user interface and viewing device 100 operations can be automatically distributed to specific or groups of viewing devices 100 via networking technologies.

Having described an embodiment of the viewing device 100, other embodiments will now be described.

Referring again to FIG. 1 and FIG. 19, the retractable flexible digital display 400 uses a low power flexible microcapsule display layer 460 in some embodiments. The microcapsule display layer 460 is capable of displaying the last drawing or document displayed until it is necessary to switch to a different drawing or document.

Accordingly, the microcapsule layer 460 in conjunction with the upper transparent protective layer 415 and the flexible active matrix driver layer 475 is capable of generating drawings and documents displayed on the flexible microcapsule display layer 460 which are to be seen by the user.

The retractable flexible digital display assembly 400 comprises a flexible active matrix (OLED) RGB color display 440 or in an alternative embodiment a flexible microcapsule display layer 460 typically 1/10 millimeters in thickness. The retractable flexible digital display assembly 400 includes a transparent protective weather resistant upper layer 415 typically 3 to 4 mils thick including adhesive required to bind to both the flexible active matrix (OLED) RGB color display 440 or in an alternative embodiment a flexible microcapsule display layer 460 and the protective weather resistant lower layer 420. The flexible active matrix (OLED) RGB color display 440 or in an alternative embodiment a flexible microcapsule display layer 460 includes a protective weather resistant lower layer 420 typically 3 to 4 mils thick including adhesive oppositely disposed relative to the transparent weather resistant upper protective layer 415. In one embodiment, the aperture opening is approximately two millimeters allowing the retractable flexible digital display assembly 400 to retract easily within the portable weatherproof shock resistant storage housing of the central casing 640. The aperture opening include opposing channels on the central casing 640 and the retractable flexible digital display assembly 400 which interlock when the flexible digital display assembly 400 is fully retracted to reduce dust and other unwanted pollutants. In addition to interlocking channels, the aperture opening comprises strips of felt oppositely disposed along the upper and lower edges of the aperture opening to prohibit debris and dust from entering the central casing 640.

In yet another embodiment a flexible active matrix driver layer 475 is placed in between flexible microcapsule display layer 460 and the protective lower layer 420 as seen in FIG. 19. The flexible active matrix driver layer 475 comprises a flexible circuit board manufactured by companies such as 3M and produced with one metal or two metal circuits constructed on flexible Polyimide or LCP substrates. For example, one layer LCP substrate manufacturing is capable of one metal fine pitch circuitry to 65 μm (prototypes capable of 30 μm). These one metal LCP circuits are available and currently manufactured by 3M and sold as Microflex. The fine pitch circuits are organized in an active matrix or grid (crisscross) type design with all intersecting points addressable (as shown in FIG. 30) by the display controller 220. The display controller 220 is capable of sending an electric current to a specific coordinate or set of many coordinates concurrently which electrically interact with the particles within the flexible microcapsule display layer 460 which is adhered to the flexible active matrix display driver layer 475 or directly to the pixels of the flexible active matrix (OLED) RGB color display 440. Once charged by flexible active matrix display driver layer 475, those electrically charged particles within the flexible microcapsule display layer 460 or the pixels of the flexible active matrix (OLED) RGB color display 440 are capable of generating an image, text, pictures and diagrams as shown in FIG. 31.

Referring to FIGS. 30-41, the flexible active matrix driver layer 475, in one non-limiting embodiment includes a circuit assembly 155 flexible substrate 150 perforated with laser or chemically milled vias 160 to allow an electrical current to travel along the drain line circuit 180 to the pixel electrode 170. The drain line circuit 180 passes through the flexible substrate 150 to the pixel electrode 170. In this embodiment the pixel electrode 170 is oppositely disposed with respect to the select line circuit 165, dielectric layer 175, drain line circuit 180, data line circuit 185 and semiconductor 190.

Referring to FIGS. 42A-42G, the radio frequency (RF) pen and pickup assembly 700 serves as a drawing change mechanism for the viewing device 100 in some embodiments. For example, a user may highlight (red line) the drawing displayed on the retractable flexible digital display assembly 400 which in turn may be submitted to the responsible architects and engineers so that a change can be made permanent and distributed to other viewing devices allocated to the same project.

The radio frequency (RF) pen and pickup assembly 700 also serves as a user input to switch quickly between drawings and related specification documents in some embodiments. The radio frequency (RF) pen and pickup assembly 700 further serves as a user input to quickly switch between drawings and related drawing bulletins that are embedded within the drawing in embodiments of the invention.

The radio frequency (RF) transmitter pen and sensor pickup assembly 700 includes a sensor assembly housing 710, a driver PCB assembly 715 and a radio frequency pickup sensor 720. The sensor assembly housing 710 consists of a housing end cap 725, a housing screw boss 730, the housing alignment pin 735 and a discreet wiring hole 740.

In one embodiment of the viewing device 100, drawings and documents can easily be called to be displayed on the retractable flexible digital display assembly 400 per the programmable touch screen display 645. When the viewing device 100, uses radio frequency (RF) pen and pickup assembly 700, the user selects a related specification document or bulletin release by selecting an icon on the retractable flexible digital display assembly 400.

In yet another embodiment of the viewing device 100, radio frequency sensors 700 would be located at both ends of the viewing device 100 so, that they may receive coordinate signals broadcast from a radio-wave transmitter pointing device. The technology described is available from a supplier such as Seiko Instruments USA Inc. with its exclusive Binaural Technology. Seiko's InkLink™ Data sensors incorporated into the viewing device 100 continuously listen for communications from the InkLink™ pen while it tracks the natural movement of your hand. As one writes anywhere on the retractable flexible digital display assembly 400 with the InkLink™ pen, the InkLink™ Data sensors read precisely the location of the pen tip and communicates its exact position to the viewing device 100 to support highlighting changes and written notes through software to drawings, images or text displayed on the flexible digital display assembly 400. These changes and notes can be attached to specific drawing, image or text pages and sent to the author of the drawing, image or document by any of the network means integrated into the viewing device 100 enabling changes to made by the author and re-distributed back to the viewing device 100 in a fraction of the time the same change process would take when changes are made to paper drawings, images and documents. The advantages of the invention enabling electronic or digital changes in comparison to traditional paper "red-lining" in the Architecture, Engineering and Construction business will be readily apparent, including reduction or elimination of couriers now required for delivery of paper red-lined documents.

A further embodiment of the viewing device 100 includes a help mode. The help mode is selected through the programmable touch screen display 645 (or other integrated or peripheral control means). Information regarding the operation of the display device 100 is then displayed on the retractable flexible digital display assembly 400.

Figure 20:
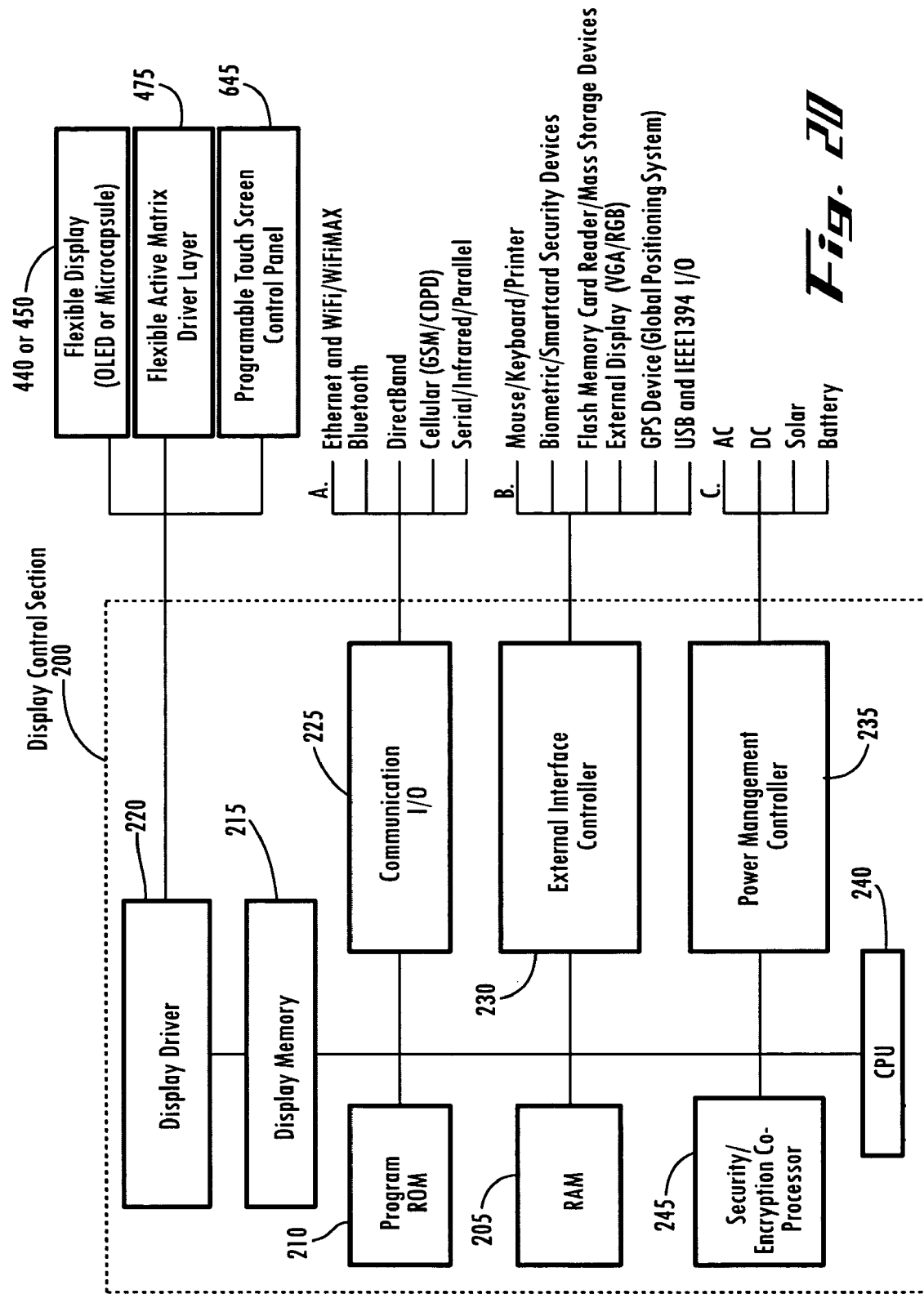
FIG. 20 is a logical block diagram of the internal electronics used to create the visual image, securely send and receive data, and securely store data on the portable retractable flexible digital display in an embodiment of the invention.
Figure 21:
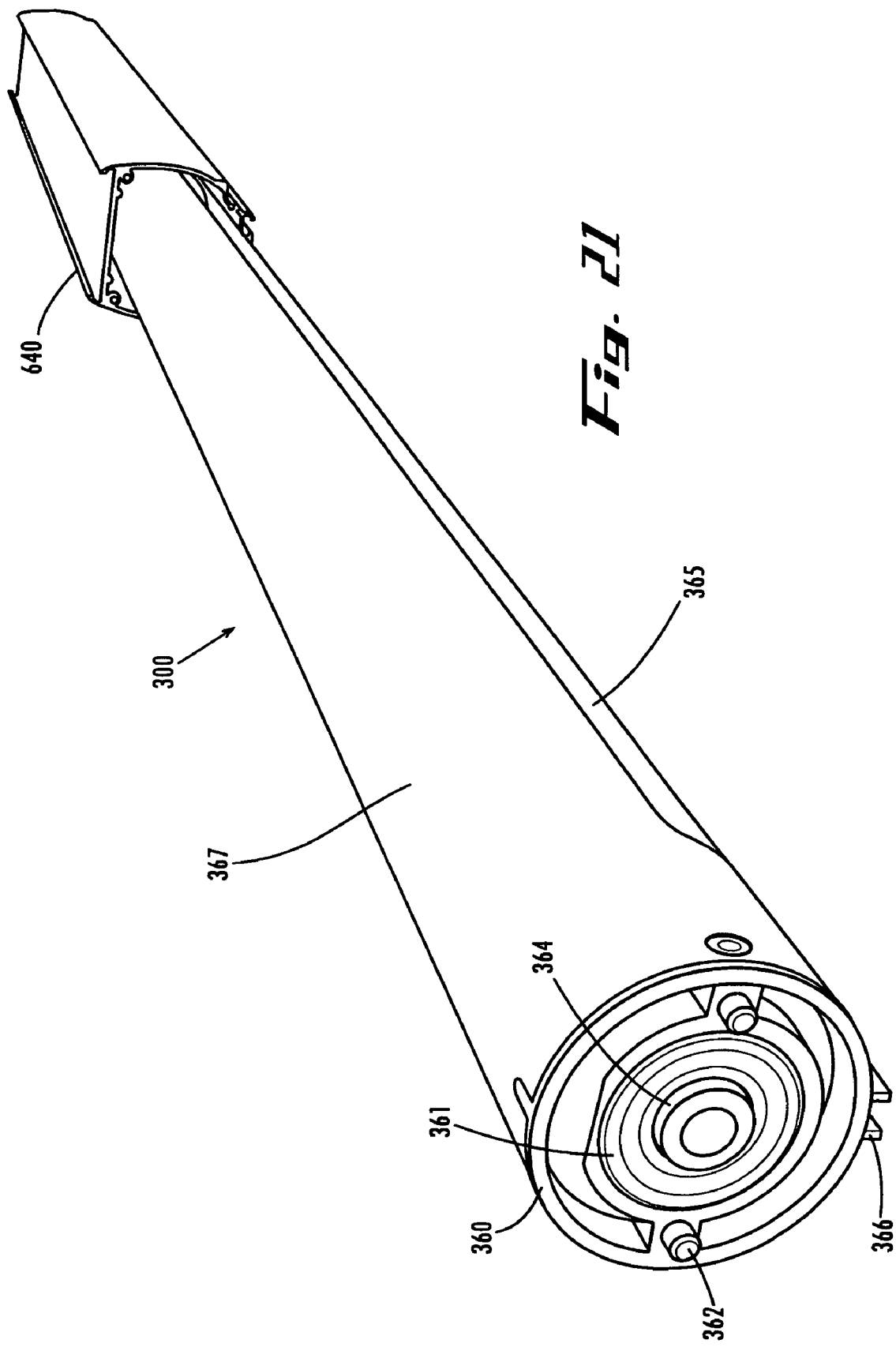
FIG. 21 is a perspective view showing the display cartridge spooling mechanism in an embodiment of the invention.

Referring to FIG. 20, in additional embodiments, the viewing device 100 includes components enabling the viewing device 100 to communicate with peripheral devices through a communications I/O controller 225. In one example, network communications means such as wired and wireless Ethernet networking and other widely available internet networking technologies (Bluetooth, DirectBand, Cellular, Serial, Infrared and Parallel) is provided within the portable weatherproof shock resistant storage housing of the device 100 to enable data exchange, such as updates of drawings and documents to be downloaded into memory for use.

In still further embodiments, the viewing device 100 includes components that enable the viewing device 100 to receive data from the external interface controller 230. As an example, GPS (Global Positioning System) data or GPS-derived data enables users to locate themselves, objects of interest, and/or other users of similar devices on a much larger electronic map than is otherwise available on handheld and laptop size electronic displays.

The display control section 200 operates the retractable flexible digital display assembly 400, the programmable touch screen display 645 and the flexible sensing control layer 460. The display control section 200 comprises a RAM module 205, Program ROM 210, display memory module 215, a display controller 220, communication I/O controller interface 225, an external interface controller 230, a power management controller 235 and a CPU 240. Connected to the external interface controller 230 are mouse, printer, VGA/RGB monitor, USB and Firewire/IEEE1394 ports along with the flash card reader 630.

The CPU 240 performs data processing, controls the display caching memory module 215, and controls data processing in the RAM 205, namely, displays data concerning the display memory module 215 on the retractable flexible digital display assembly 400 via the external interface 230 and stores display information transferred via the external interface 230 in RAM 205 until it is ready to be displayed on the retractable flexible digital display assembly 400. The ROM 210 stores programmatic processing procedures of the CPU 240. The communication I/O controller 225 interfaces with the CPU 240 to perform data processing on data that has been received from communication modules installed before it is transferred to RAM 205 until it is ready to be displayed on the retractable flexible digital display assembly 400. The display memory module 215 stores data directly prior to being displayed on the retractable flexible digital display assembly 400. The display memory module 215 is responsible for caching of data concerning display of data received by the CPU 240. The display controller 220 displays the drawing data in the display memory module 215 on the retractable flexible digital display assembly 400 and is responsible for sizing the drawing and documents appropriately based on the size of retractable flexible digital display assembly 400 used. The display controller 220 also receives instructions from the programmable touch screen control 645 and the flexible touch screen control layer 460 and then sends the received instructions to the CPU 240 where they are processed. Received instructions could include changing the drawing which is currently displayed, highlighting changes that need to be made by the drawing architect or engineer (known as red lining), changing between displayed drawing specifications, etc . . . The RAM 205 also stores data other than the display information transferred via the external interface 230.

Figure 47:
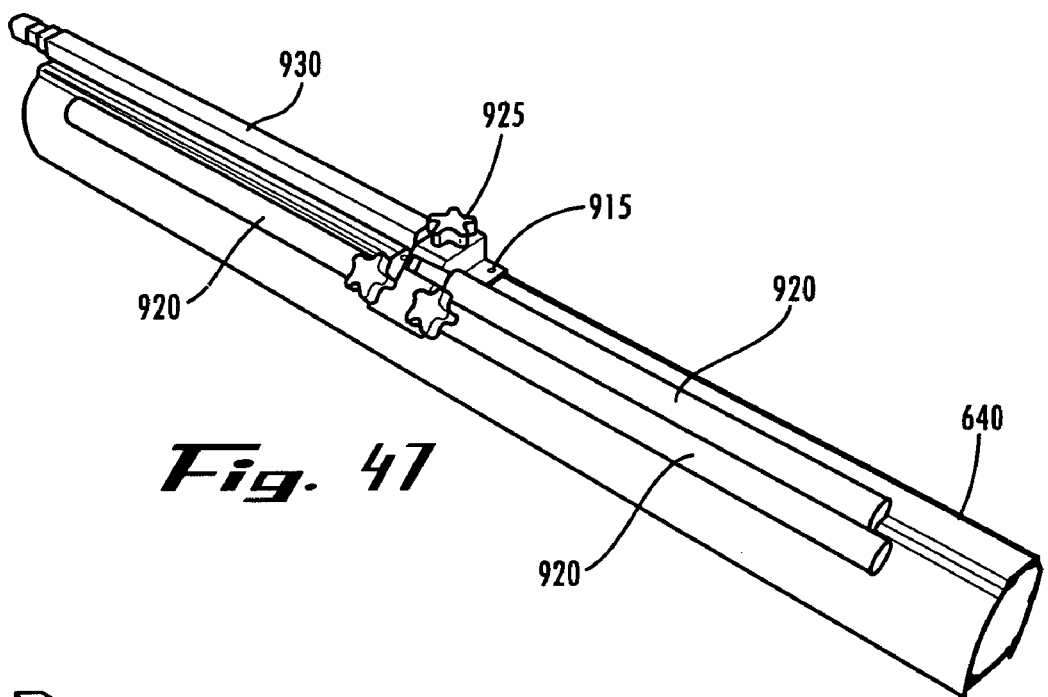
FIG. 47 is a top perspective view of a tripod assembly in an embodiment of the invention.
Figure 48:
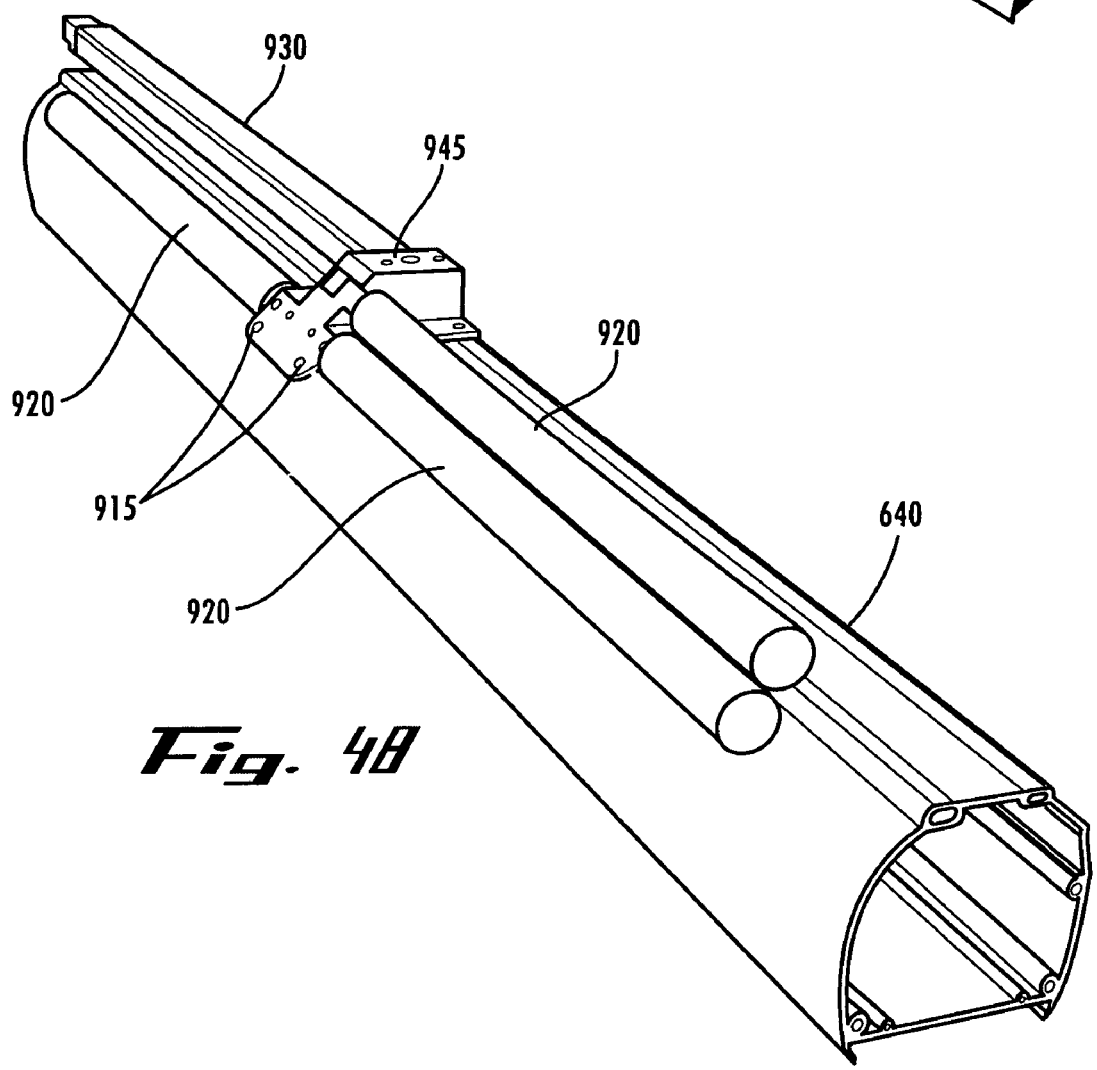
FIG. 48 is a perspective view of a tripod assembly with spring-loaded locking buttons (détented) in an embodiment of the invention.

In still other embodiments, shown in FIGS. 47-48, the viewing device 100 includes components that enable viewing device 100 to operate in an upright stand alone presentation mode. For example, the viewing device 100 with a portable attachable tripod with extendable legs 900 is used so that drawings, documents, project plans, maps, video and other large format images can be displayed as a presentation to many people in the same room. The portable tripod with heavy-duty aluminum extruded legs 920 with a release mechanism offers a wide stance for maximum stability that is able to withstand daily usage. The tripod assembly stand legs 920 are held in place by tightening the hand screw locking knobs 925. In an alternate embodiment, the tripod assembly stand legs 920 are held in place by spring-loaded (Détented) locking buttons 945. Screen height is adjustable to accommodate any height with self-locking telescoping extension mast 930 and high-low case adjustment. The tripod assembly 900 is attached to the viewing device 100 main housing with removable attachment screws 915. The device, in other embodiments, has the means to communicate with a high resolution overhead LCD projectors so that drawings, documents, project plans, maps and other large format images can be displayed in an even larger scale as a presentation to many more people in the same room.

The viewing device 100 also includes, in another embodiment, devices and means that enable encryption of data stored within the device as well as communication to and from the viewing device 100. A security/encryption co-processor 245 provides a higher level of security/encryption than would otherwise be available through a software-only solution. Biometric and smart-card devices, as examples, are able to be integrated to provide a higher level of authentication services than would a simple or complex password for the display device 100.

Examples of biometric security can include fingerprint reading hardware and software. In one embodiment, shown in FIGS. 2, 3, 4 and 5A-5E, the user interface bezel assembly 605 can include a biometric security interface 610. The biometric security interface 610 includes a sensor aperture 616, a sliding finger sensor 615, sensor PCB board 617, flex jumper solder aperture 618 and a sliding finger sensor chip 619.

With reference to FIGS. 6A-6E, in one embodiment of the viewing device 100, the main extrusion molded fascia panel 620 can be engineered to incorporate a solar panel bezel assembly 650 for providing a trickle charge to the device battery 523 while the viewing device 100 is unplugged from a an AC power source. The solar panel bezel assembly 650 includes a solar panel 655, a solar panel bezel 660 and a solar panel wiring harness 665.

In alternative embodiments of the present invention, an interface is provided from the screen such as through a port in the housing, connection cable, and the like, to enable a computer, personal digital assistant, or other independent data processing component to be connected to a retractable screen of the invention. For instance, an FPC (described below) connection may be provided from the screen to a connection point or adapter cable or cards (e.g. VGA, serial and like connectors) for connection to a PDA or computer outside of the housing. In such alternative embodiments, the external processor may supplement or replace the internal CPU of the embodiment described above.

Referring to FIGS. 21, 22, 27 and 28, the display cartridge spooling mechanism 300 comprises a shaft 320, sealed roller bearings 361, mechanical roller clutch 510 and an electric motor 515. The shaft 320 is constructed of durable and lightweight material such as aluminum. The sealed roller bearing 361 is mounted within a rubber/plastic cartridge end bushing 360 attached to the display cartridge assembly 300. Mounting the bearing raceway within the portable weatherproof shock resistant storage housing on a rubber/plastic display cartridge end bushing 360 enables the display cartridge spooling mechanism 300 to be held in a shock resistant manner. Mounting the display cartridge spooling mechanism 300 on sealed roller bearings 361 which connect to the display reel shaft 320 on a bearing race 304, also enables a very smooth extension and retraction of the flexible digital display assembly 400. The mechanical roller clutch 510 enables the display cartridge spooling mechanism 300 to freely roll in one direction enabling the extension from central casing housing 640 by manually pulling on the handle end of the retractable flexible digital display assembly 400 which extends from the central casing housing 640. Once the user retracts the flexible digital display assembly back within the central casing housing 640, the mechanical roller clutch 510 (driven by the electric motor 515) drives the display cartridge spooling mechanism shaft 320 in the opposite direction enabling the retractable flexible digital display assembly 400 to retract within the central casing housing 640. Constructing the display cartridge spooling mechanism 300 including the shaft 320, display cartridge end bushing 360, sealed roller bearings 361, mechanical roller clutch 510 and an electric motor 515 of a lightweight and durable material enables the device to be completely portable.

The retractable flexible digital display assembly 400 receives data signals for creating images and text from the display controller 220 of the main electronic PCB board 270 travel from the quick connect female coupling 265 to the male quick connect slipring coupling 302 through the multiple conductor slipring 301 which is attached to the display cartridge assembly 300 with the slipring mount plate 305. The wiring from the end of the slipring 301 that attaches the slipring mount plate 305 to the display cartridge end bushing 360 travels inside the display reel shaft 320 via the display cartridge flex circuit aperture 364 to the display reel circuit aperture 331 where it connects with the display reel flex circuit jumper 330. The data signal travels along the display reel circuit jumper 330 until it reaches the flexible display elastomeric connector 335. There is a matching elastomeric connector 335 built into the flexible digital display assembly 400 that carries the data signals to the flexible active matrix driver layer 475 or the flexible active matrix (OLED) RGB color display layer 440.

The retractable flexible digital display assembly 400 is attached physically to the display reel shaft 320 with a display reel retaining plate 321 that runs the whole length of the display reel shaft 320 so that there are no points along the flexible digital display assembly 400 that incur more stress as the flexible digital display assembly 400 is wound around the display reel shaft 320. There are several display reel retaining plate screws 322 to hold the display reel retaining plate 321 in place that are spaced out along the length of the display shaft reel 320. As the flexible digital display assembly 400 is retracted within the display cartridge assembly 300 through the display cartridge aperture 365 the display centering devices 340, which each maintain a ninety degree angle near the display reel shaft 320 and open to a wider angle away from each other as they intersect with the display cartridge protective housing 367, act as guides to center the flexible digital display assembly 400. This design keeps the flexible digital display assembly 400 centered and controlled as it is retracted rather than loose and shimmying from one side of the display cartridge aperture 365. This design allows for a smoother retraction.

The display cartridge assembly 300 has an outer protective housing 367 that is attached to the display cartridge bushing ends 360 with assembly mounting screws 369. The display cartridge assembly 300 protective housing 367 aligns appropriately with the flexible display handle 405 with an alignment pin 368 in the display cartridge bushing ends 360. The display cartridge assembly 300 resides within the main extrusion outer housing 640 and must align properly at both ends of the display cartridge assembly 300. The display cartridge assembly 300 aligns with the main central casing extrusion outer housing 640 also by sliding it along a single cartridge alignment channel 366 which also does not allow the display cartridge assembly 300 to move around within the central casing 640. At the drive end of the display cartridge assembly 300 there are two cartridge alignment pins 362 that connect with the upper casing assembly 500. The drive end of the display reel shaft 320 has a drive slot 363 which extends from the display cartridge assembly 300 to interface with the upper casing assembly 500.

In one embodiment, the upper casing assembly 500 is motorized and includes a stepper motor 515 which is attached to the output mount plate assembly 505 with sealed bearings 508. The stepper motor 515 drive shaft 544 has an attached drive shaft gear 545 which is keyed to match the output drive shaft gear 526 connected to output drive shaft 525. The output drive shaft 525 extends through the output mount plate assembly 505 through sealed bearings 508 for a smooth rolling shaft. The output drive shaft 525 end is keyed to insert into the display cartridge assembly 300 drive slot 363 and provide the maximum power transition from drive assembly to the display reel shaft 320. The motor power and control wiring harness 546 extends from the stepper motor 515 and plugs into the quick connect data and power wiring harness 150 that runs within the main extrusion outer housing 640 and connects the lower casing assembly 250 with the upper casing assembly 500. The upper casing assembly 500 has a manual access retraction shaft 541 attached to the stepper motor 515 that can be accessed through the manual retraction case access opening 548. This opening to the manual retraction shaft 541 allows users of the viewing device 100 to retract the display in the event that there is a problem with the stepper motors 515 operation.

In another embodiment of the viewing device 100 the upper casing assembly 500 has a manual thumb drive wheel 522 which is attached to the knob drive shaft 527 on the electromagnetic clutch 510. The clutch 510 is mounted to the drive support plate assembly 530 which allows the movement and position of display reel shaft 320 to be controlled by the user of the viewing device 100. The drive shaft gear 529 that is attached to the clutch 510 drive shaft 511 has an attached drive shaft gear 529 which is keyed to match the output drive shaft gear 526 connected to output drive shaft 525. The output drive shaft 525 extends through the output mount plate assembly 505 through sealed bearings 508 for a smooth rolling shaft. The output drive shaft 525 end is keyed to insert into the display cartridge assembly 300 drive slot 363 and provide the maximum power transition from drive assembly to the display reel shaft 320. The electromagnetic power and control wiring harness 528 extends from the electromagnetic clutch assembly 510 and plugs into the quick connect data and power wiring harness 150 that runs within the central casing 640 and connects the lower casing assembly 250 with the upper casing assembly 500.

In another embodiment of the viewing device 100 the upper casing assembly 500 has a spring 553 to drive the retraction of the display cartridge assembly 300. The clutch 510 is mounted to the drive support plate assembly 555 which has brackets for the spring and clutch and allows the movement and position of display reel shaft 320 to be controlled by the user of the viewing device 100 by switching power to the clutch 510. The drive shaft gear 529 that is attached to the clutch 510 drive shaft 511 has an attached drive shaft gear 529 which is keyed to match the output drive shaft gear 526 connected to output drive shaft 525. The output drive shaft 525 extends through the output mount plate assembly 505 through sealed bearings 508 for a smooth rolling shaft. The output drive shaft 525 end is keyed to insert into the display cartridge assembly 300 drive slot 363 and provide the maximum power transition from drive assembly to the display reel shaft 320. The electromagnetic power and control wiring harness 528 extends from the clutch assembly 510 and plugs into the quick connect data and power wiring harness 150 that runs within the central casing outer housing 640 and connects the lower casing assembly 250 with the upper casing assembly 500.

All three of the described embodiments of the upper casing assembly 500 (motorized, manual thumb drive wheel, spring-driver) house the battery 523 for powering the viewing device 100. A battery 523 is used when the viewing device 100 is not plugged into an AC outlet. When AC power is available, when the viewing device 100 can be charged and used by plugging the viewing device 100 into an AC wall socket through the AC power receptacle 524. When an AC power source is used to recharge the device battery 523 power travels through the AC/DC power inverter 547 before reaching the device battery 523.

In another embodiment of the viewing device, the retractable flexible digital display assembly 400 connects to the display controller 220 via Flex-coil circuit jumper 351 or flexible printing circuitry (Commonly referred to as FPC). This FPC is wound within the flex-coil connector cartridge 350 mounted on the display cartridge spooling mechanism 300 shaft 320 in the opposite direction than the retractable flexible digital display assembly 400 is wrapped within the flex-coil connector cartridge 350 on the display cartridge spooling mechanism 300 shaft 320 with adequate revolutions within the flex-coil connector cartridge 350 to enable the retractable flexible digital display assembly 400 to extend fully without binding, stretching or detaching the flexible digital display assembly 400 and the flexible printing circuit from the controller 220.

In embodiments of the invention, a shoulder strap allows easy transport of the display device 100. The shoulder strap assembly 800 includes an adjustable shoulder strap 810, an adjustable shoulder pad 805 and strap mount openings 825 using a stainless steel strap plate inserts 830 molded into the upper and lower case bumper assemblies. In another embodiment of the shoulder strap assembly, custom molded removable strap mounts 815 are used in place of the upper and lower case bumper integrated strap mounts inserts 830 and attached to the viewing device 100 using attachment screws 820.

It will be appreciated that the invention may be scaled to the size and memory/power needs of the intended use of the invention. In addition, conventional or touch screen displays may be implemented. Further, additional accessories, such as wired or wireless keyboards, mouse controllers, joysticks, and the like may by used in connection with the present invention.

Those skilled in the art will further appreciate that flexible display components may be provided from companies such as E-Ink, Gyricon, Sony Philips, HP and others. Touch-screen components may be provided by E-Ink, 3M ENL and others. A protective display layer is available through 3M and others. Processors are available from several entities including Intel. Exemplary operating systems and applications used in the present invention may include, merely by way of illustration, Microsoft, Adobe, and AutoCADD. General electronics suppliers include JACO Electronics, Jameco Electronics and others. Electronics and wiring components are available from Techwave, E-Storage Technology and others. Exemplary retractable, rolling mechanisms include components provided by Reell, Inertia Dynamics, Hangzhou Bay Bearings, Helander Products, Rollermaker, Techna, Vlier, MicroMo Electronics, Faulhaber and others.

Although the present invention has been described in specific detail with reference to the disclosed embodiments, it will be understood that many variations and modifications may be affected within the spirit and scope of the invention. For instance, those skilled in the art will appreciate that present device is not limited for use of viewing drawings in association with the architectural and construction industries, but that the invention may be used for virtually any portable viewing need including, for example, replacing traditional laptop devices, used for viewing electronic publications, portably viewing video, video game display, and other similar activities utilizing a retractable screen for electronic viewing.

What is claimed is:

1. A flexible display device comprising:
   a portable tubular housing;
   a retracting reel rotatably mounted in the portable tubular housing;
   a flexible display support tray retractably connected to the retracting reel for protectively supporting behind a flexible electronic display that is retractable into the portable tubular housing with the flexible display support tray; and
   a roller clutch, wherein the roller clutch is operable to oppose movement of the retracting reel to limit the speed of the retracting reel during retraction of the flexible electronic display.

2. The flexible display device of claim 1 wherein the flexible electronic display includes an active matrix circuit layer with addressable matrix points within a viewing area.

3. The flexible display device of claim 1 further comprising a display sizing sensor to provide screen dimensions to a central processing unit in the portable tubular housing based on the distance the flexible display support tray extends out of the portable tubular housing.

4. The flexible display device of claim 1 further comprising a sensor for receiving a signal from an electronic marking device used with the flexible electronic display.

5. The flexible display device of claim 4 wherein the electronic marking device is a wireless pen.

6. The flexible display device of claim 1 wherein the portable tubular housing includes a shoulder strap.

7. The flexible display device of claim 1 wherein the portable tubular housing includes one or more extendible legs for supporting the flexible display device upright for viewing.

8. The flexible display device of claim 1 wherein the retracting reel is mounted in a removable display cartridge.

9. The flexible display device of claim 1 wherein the portable tubular housing includes a manual winding wheel operably connected to the retracting reel.

10. The flexible display device of claim 1 further comprising a spring assembly in the portable tubular housing to drive the retracting reel to retract the flexible display support tray and the flexible electronic display.

11. The flexible display device of claim 1 further comprising a motor in the portable tubular housing for driving the retracting reel to retract the flexible display support tray and the flexible electronic display.

12. A flexible display device comprising a retracting reel rotatably mounted in a housing, wherein the retracting reel is connected to a roller clutch, wherein the roller clutch is operable to enable extraction of a flexible electronic display connected to a power source and a data source in the housing, and wherein the roller clutch is further operable to oppose movement of the retracting reel to limit speed of the retracting reel during retraction of the flexible electronic display.

13. The flexible display device of claim 12 further comprising a flexible tray containing the flexible electronic display.

14. The flexible display device of claim 13 wherein the flexible tray includes a user interface for controlling display of images on the flexible electronic display.

15. The flexible display device of claim 14 further comprising a display sizing sensor.

16. The flexible display device of claim 12 further comprising a marking device sensor for receiving a signal from an electronic writing instrument used with the flexible display device.

17. The flexible display device of claim 12 further comprising a network connector for receiving data from a computer.

18. The flexible display device of claim 12 further comprising an active matrix circuit operatively connected to the flexible display device for generating images on the flexible electronic display based on addressable points in a matrix.

19. The flexible display device of claim 12 further comprising a position transceiver for calculating device position.

20. A flexible display device comprising a housing with a flexible electronic display that is retractable into the housing by a winding reel connected to a roller clutch, wherein the roller clutch is operable to enable extraction, and wherein the roller clutch is further operable to oppose movement of the winding reel to limit the speed of the winding reel during retraction of the flexible electronic display, and wherein the flexible electronic display is at least 22 inches wide and 17 inches tall.

21. The flexible display device of claim 20 wherein the flexible electronic display is at least 42 inches wide and 30 inches tall.

22. The flexible display device of claim 20 including a winding controller selected from the group consisting of a manual wheel, a motor, and a spring.

23. The flexible display device of claim 20 further comprising a sensor for detecting a marking device interface to images on the flexible electronic display.

24. The flexible display device of claim 23 wherein the marking device interface is wireless.

25. The flexible display device of claim 20 further comprising sizing means for determining the size of a partially extracted flexible electronic display.

26. The flexible display device of claim 20 further comprising one or more impact bumpers on the housing.

27. The flexible display device of claim 20 further comprising a flexible data cable having an interface to the flexible electronic display, wherein the flexible data cable is configured to wind with the flexible electronic display.

28. The flexible display device of claim 21 wherein the housing includes a plurality of removable casings for servicing or replacing components.

* * * * *